US011409616B2

(12) United States Patent
Gurajada

(10) Patent No.: US 11,409,616 B2
(45) Date of Patent: *Aug. 9, 2022

(54) RECOVERY OF IN-MEMORY DATABASES AFTER A SYSTEM CRASH

(71) Applicant: SAP SE, Walldorf (DE)

(72) Inventor: Aditya Gurajada, Hyderabad (IN)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/122,831

(22) Filed: Dec. 15, 2020

(65) Prior Publication Data
US 2021/0103501 A1  Apr. 8, 2021

Related U.S. Application Data

(63) Continuation of application No. 16/006,513, filed on Jun. 12, 2018, now Pat. No. 10,891,202.

(30) Foreign Application Priority Data

May 15, 2018  (IN) .............................. 201811018113

(51) Int. Cl.
*G06F 7/00* (2006.01)
*G06F 11/14* (2006.01)

(52) U.S. Cl.
CPC ...... *G06F 11/1469* (2013.01); *G06F 11/1474* (2013.01); *G06F 2201/84* (2013.01)

(58) Field of Classification Search
CPC ............ G06F 11/1469; G06F 11/1474; G06F 11/1471; G06F 11/1448; G06F 2201/84; G06F 2201/80
See application file for complete search history.

(56) References Cited

U.S. PATENT DOCUMENTS

| 10,372,548 | B2* | 8/2019 | Brown ................ G06F 11/1448 |
| 10,891,202 | B2  | 1/2021 | Gurajada |
| 2019/0004851 | A1* | 1/2019 | Doshi .................... G06F 9/466 |
| 2019/0026193 | A1* | 1/2019 | Zheng ................... G06F 11/14 |
| 2019/0163579 | A1  | 5/2019 | Pothoff et al. |
| 2021/0103502 | A1  | 4/2021 | Gurajada |

* cited by examiner

*Primary Examiner* — Mohammad A Sana
(74) *Attorney, Agent, or Firm* — Fountainhead Law Group P.C.

(57) ABSTRACT

Data recovery in a database includes performing a backward scan of a transaction log that records transactions made on the database. The backward scan includes traversing log records starting from a latest-in-time log record toward the beginning of the transaction log. Each log record can be replayed to recover data for a database row associated with the log record. An earlier-in-time log record is skipped if the associate database row has been recovered by later-in-time log record.

20 Claims, 14 Drawing Sheets

RECOVERY OF IN-MEMORY DATABASES AFTER A SYSTEM CRASH

CROSS REFERENCE TO RELATED APPLICATIONS

This application is a continuation of U.S. patent application Ser. No. 16/006,513, filed Jun. 2, 2018, which issued as U.S. Pat. No. 10,891,202, which pursuant to 35 U.S.C. § 119(a) is entitled to and claims the benefit of the filing date of Indian Patent Application No. 201811018113, filed May 15, 2018 in the Indian Patent Office, each of which is incorporated herein by reference in its entirety for all purposes.

U.S. patent application Ser. No. 16/006,513 is related to U.S. application Ser. No. 15/859,181 filed Dec. 29, 2017, which issued as U.S. Pat. No. 10,922,296, the content of which is incorporated herein by reference in its entirety for all purposes.

BACKGROUND

In-memory database (IMDB) systems leverage the availability of high-memory systems. Performance in such databases is extremely high in comparison to disk-resident databases, as all access and changes to data is fully in-memory.

Persistence to changed and committed data in in-memory databases is typically done through an operation called "logging." Logging involves writing to disk storage some information, referred to as "log records" that can be used to re-create the final state of committed in-memory data. The disk device to which the logging information is stored is typically referred to as the transaction log. Upon a system or server crash, the final committed contents of the in-memory data can be re-instantiated by a process known as "recovery," using the information saved in the transaction log.

In the case where the IMDB has a large amount of memory, say for example, 100 GB, the associated transaction log can also be very big. The size of the transaction log can greatly increase far beyond the in-memory data itself if the data was constantly changed, updated, and deleted. Merely to illustrate this point, the 100 GB of in-memory data could well have a transaction log of size 500 GB, or even more.

SUMMARY

A facility is disclosed for data recovery in an in-memory database. The facility can include methods, non-transitory computer-readable storage media that embody the methods, and apparatus for accessing a transaction log having stored therein a plurality of transaction blocks. Each transaction block can be associated with a database transaction and can comprise a plurality of log records corresponding to operations of the associated database transaction. The plurality of transaction blocks can be ordered according to when their corresponding database transactions were completed. The plurality of log records in each transaction block can be ordered according to when their corresponding operations were performed on the database.

The facility can include recovering data in the database, including accessing a range of transaction blocks in the transaction log in reverse chronological order, starting from a latest transaction block and ending with an earliest transaction block that occurs earlier in time than the latest transaction block.

The facility can include, for each transaction block accessed from the range of transaction blocks, recovering database rows in the database that were acted on by the database transaction that generated the accessed transaction block, including accessing log records comprising the accessed transaction block in reverse chronological order, starting with a latest log record and ending with an earliest log record that occurs earlier in time than the latest log record.

The facility can include, for each log record accessed, skipping processing of the accessed log record, when a database row associated with an operation that corresponds to the accessed log record has been previously recovered, and when the database row has not been previously recovered, then processing the accessed log record to recover the database row according to the accessed log record.

The following detailed description and accompanying drawings provide further understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Figure 1:
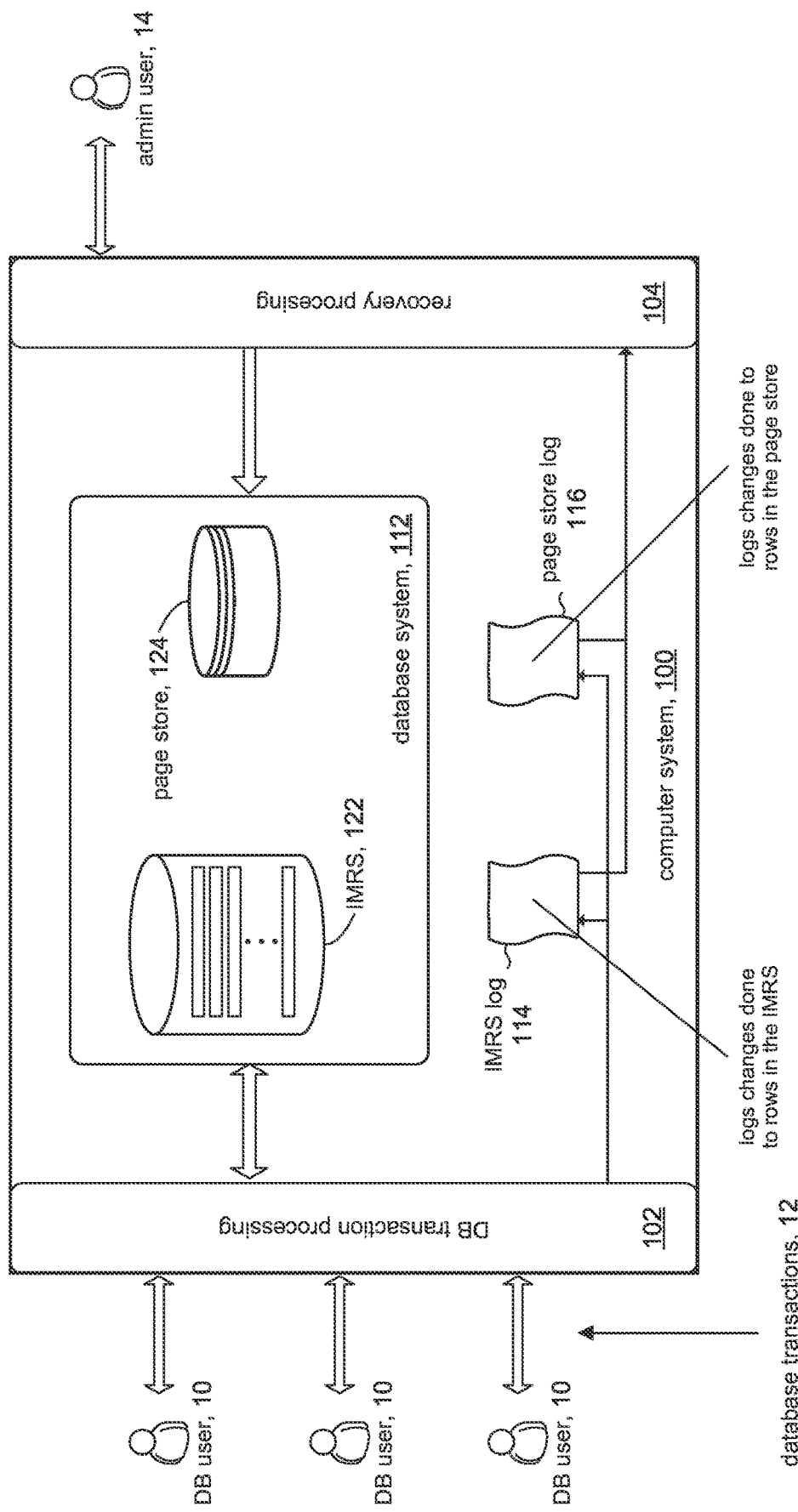
FIG. 1 shows a high level representation of a database system in accordance with some embodiments.

Conventional implementations of recovery of in-memory data from the transaction log involves replaying the entire set of log records comprising the transaction log from the beginning of the transaction log through to the end, going through the same sequence of changes done to the data at run-time while it was in-memory. As an example, if a new row was inserted, and updated 5 times, this will generate 5 log records: one for the insert and one each for the update operations. Conventional recovery schemes will replay each of the log record, which involves a total of 6 operations re-done in the system during recovery. "Re-do" of a log record involves allocating memory, and copying the contents of the data row from the log record to the allocated memory. Re-do involves working with the in-memory database, which can be an expensive operation.

The performance of conventional recovery of in-memory data from a transaction log can be very challenging and slow in some cases. This results in a slow re-start time after a crash or planned shutdown of the database engine. Slow recovery times results in loss of data availability, thereby, impacting business applications which have to be delayed until the data is fully recovered.

Embodiments in accordance with the present disclosure provide a transaction log and processing of the transaction log backward, by processing log records from the tail end of the transaction log toward the beginning of the transaction log. In one embodiment with the present disclosure, only changes from committed transactions affecting in-memory data are written as log records to the transaction log. In other words, no changes from partially completed transactions are ever written to the transaction log; thereby no undo of incomplete work is ever necessary during recovery. As log records are committed in the transaction log in time-order of their occurrence, the version of the row after the latest update will be found first by doing a backward scan of the log. Only this event is actually redone, to re-instate the final copy of the changed row in-memory, as the log record is known to be due to a committed update.

Recovery in accordance with the present disclosure can result in a computer system having a significant improvement in re-start times after a crash or planned shutdown of the database engine. The faster recovery times results in greater data availability for user, and can reduce the impact on business applications that have to wait until the data is fully recovered. The present disclosure is directed to improvements in data recovery in a computer system that lead to faster recovery of in-memory data (e.g., in-memory row store, IMRS) and more efficient use of memory of the IMRS which can lead to lower fragmentation of memory and improved memory layout post-recovery.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

System Architecture

FIG. 1 shows a computer system 100 in accordance with embodiments of the present disclosure to host a database system 112 to store and maintain a database of information ("database"). The computer system 100 can include a database transaction processing module 102 to provide functionality that allows database users 10 to store and access data to and from the database system 112. The database transaction processing module 102 can provide suitable interfaces for the database users 10 to access the database system 112. Database users 10 can interact with the database system 112 via database transactions 12.

The computer system 100 can include a recovery processing module 104 to provide functionality that allows administrative users 14a to perform various recovery operations on the database system 112 in accordance with the present disclosure. In some embodiments, the recovery processing module 104 can perform crash recovery after a system crash. The recovery processing module 104 can load the database system 112 from archived data (referred to as load database recovery), and particular from an archived transaction log. In some embodiments, the recovery processing module 104 can load several archived transaction logs in a process referred to a load transaction recovery.

The database system 112 can store its database in the form of data tables. In some embodiments, the database system 112 can include an in-memory row store (IMRS) database component 122 and a page store database component 124. The page store 124 can include a disk storage system to provide page-based storage of the data comprising the database. Rows in the data tables can be stored on a data page in the page store 124. The IMRS 122 is memory resident (i.e., the row store table is entirely in memory (e.g., RAM) as compared to being stored on disk), and thus can provide a high-performance storage repository for active ("hot") data. As will be explained below, the IMRS 122 can store active portions of the database.

The computer system 100 can include a transaction log called the IMRS log 114 (in some embodiments, this can be referred to as "sysimrslogs") to record information from each database transaction 12 received from a database user 10 that affects the IMRS 122. In some embodiments, for example, the database transaction processing module 102 can record operations in the IMRS log 114 that involve updates to a database row in the IMRS 122, insertion of new database rows, deletion of existing database rows, and the like. In accordance with the present disclosure, in some embodiments, the recovery processing module 104 can use the IMRS log 114 to recover the IMRS component 122 of the database system 112, which is discussed below.

The computer system 100 can include a transaction log called the page store log 116 (in some embodiments, this can be referred to as "syslogs") to record information from each database transaction 12 received from a database user 10 that affects the page store 124. Some database transactions 12 may affect only the IMRS 122, or only the page store 124, or both. In some embodiments, for example, the database transaction processing module 102 can record operations in the page store log 116 when updates are made to the page sore 124. In accordance with the present disclosure, in some embodiments, the recovery processing module 104 can use the page store log 116 to recover the page store component 124 of the database system 112, discussed below.

Figure 2:
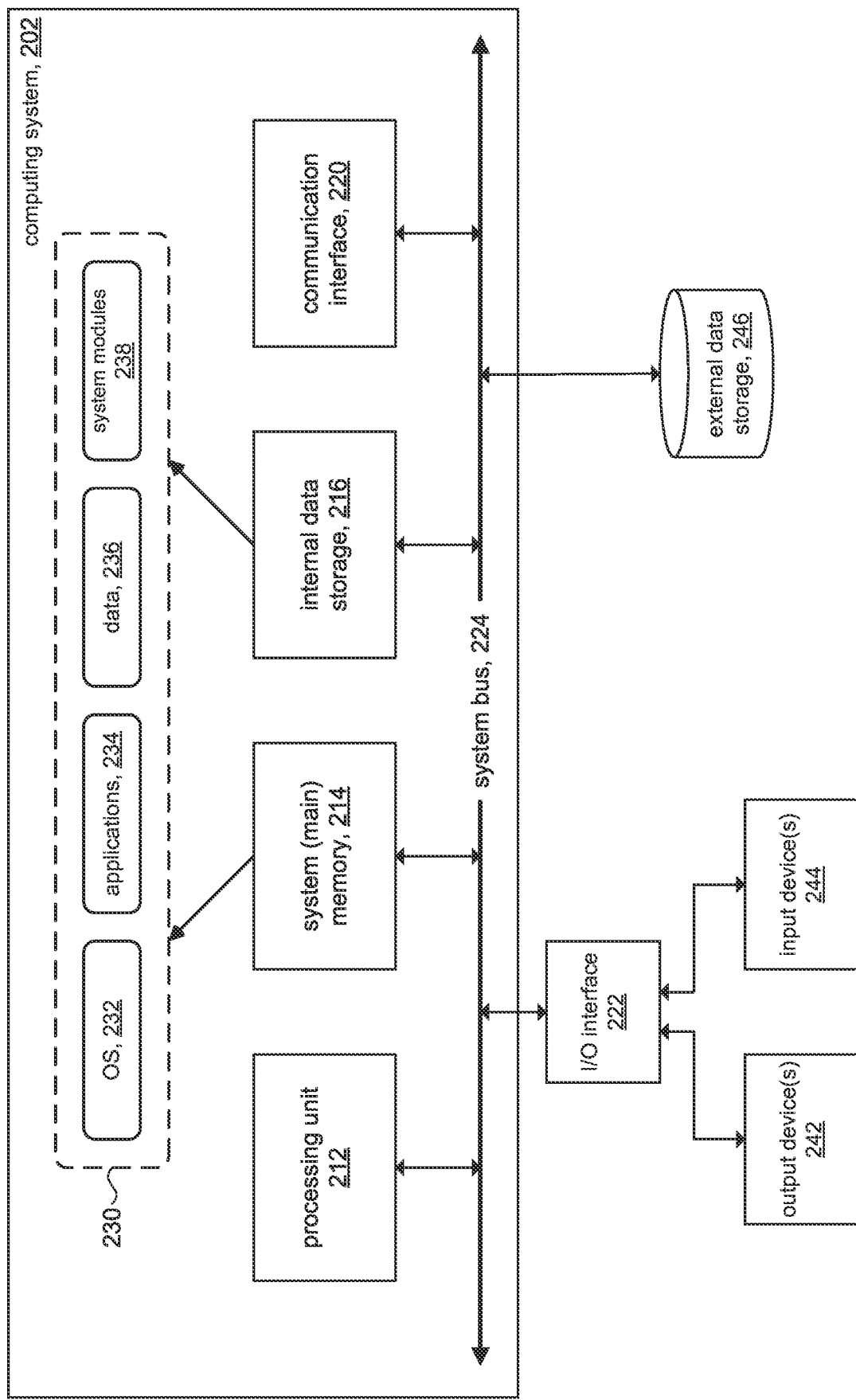
FIG. 2 is an illustrative computer system that can be configured in accordance with the present disclosure.

FIG. 2 is a simplified block diagram of an illustrative computing system 202 for implementing one or more of the embodiments described herein (e.g., computer system 100, FIG. 1). For example, the computing system 202 can perform and/or be a means for performing, either alone or in combination with other elements, operations in accordance with the present disclosure. Computing system 202 can also perform and/or be a means for performing any other steps, methods, or processes described herein.

Computing system 202 can include any single or multi-processor computing device or system capable of executing computer-readable instructions. Examples of computing system 202 include, for example, workstations, servers, distributed computing systems, handheld devices, and the like. In a basic configuration, computing system 202 can include at least one processing unit 212 and a system (main) memory 214.

Processing unit 212 can comprise any type or form of processing unit capable of processing data or interpreting and executing instructions. The processing unit 212 can be a single processor configuration in some embodiments, and in other embodiments can be a multi-processor architecture comprising one or more computer processors. In some embodiments, processing unit 212 can receive instructions from program and data modules 230. These instructions can cause processing unit 212 to perform operations in accordance with the present disclosure, for example, as described herein below or as set forth in the disclosed process flow diagrams. In some embodiments, for example, the program and data modules 230 can include the data processing module 102 and the recovery processing module 104.

System memory 214 (sometimes referred to as main memory) can be any type or form of volatile or non-volatile storage device or medium capable of storing data and/or other computer-readable instructions. Examples of system memory 214 include, for example, random access memory (RAM), read only memory (ROM), flash memory, or any other suitable memory device. Although not required, in some embodiments computing system 202 can include both a volatile memory unit (such as, for example, system memory 214) and a non-volatile storage device (e.g., data storage 216, 246). In some embodiments, system memory 214 can host the IMRS 122 (FIG. 1).

In some embodiments, computing system 202 can also include one or more components or elements in addition to processing unit 212 and system memory 214. For example, as illustrated in FIG. 2, computing system 202 can include internal data storage 216, a communication interface 220, and an I/O interface 222 interconnected via a system bus 224. System bus 224 can include any type or form of infrastructure capable of facilitating communication between one or more components comprising computing system 202. Examples of system bus 224 include, for example, a communication bus (such as an ISA, PCI, PCIe, or similar bus) and a network.

Internal data storage 216 can comprise non-transitory computer-readable storage media to provide nonvolatile storage of data, data structures, computer-executable instructions, and so forth to operate computing system 202 in accordance with the present disclosure. For instance, the internal data storage 216 can store various program and data modules 230, including for example, operating system 232, one or more application programs 234, program data 236, and other program/system modules 238. In some embodiments, for example, the internal data storage 216 can comprise disk storage subsystems for the page store 124, the IMRS log 114, and/or the page store log 116.

Communication interface 220 can include any type or form of communication device or adapter capable of facilitating communication between computing system 202 and one or more additional devices. For example, in some embodiments communication interface 220 can facilitate communication between computing system 202 and a private or public network including additional computing systems, for example, to provide database users 10 with access to the computing system. Examples of communication interface 220 include, for example, a wired network interface (such as a network interface card), a wireless network interface (such as a wireless network interface card), a modem, and any other suitable interface.

In some embodiments, communication interface 220 can also represent a host adapter configured to facilitate communication between computing system 202 and one or more additional network or storage devices via an external bus or communications channel Examples of host adapters include, for example, SCSI host adapters, USB host adapters, IEEE 1394 host adapters, SATA and eSATA host adapters, ATA and PATA host adapters, Fibre Channel interface adapters, Ethernet adapters, or the like.

Computing system 202 can also include at least one output device 242 (e.g., a display) coupled to system bus 224 via I/O interface 222. The output device 242 can include any type or form of device capable of visual and/or audio presentation of information received from I/O interface 222.

Computing system 202 can also include at least one input device 244 coupled to system bus 224 via I/O interface 222. Input device 244 can include any type or form of input device capable of providing input, either computer or human generated, to computing system 202. Examples of input device 244 include, for example, a keyboard, a pointing device, a speech recognition device, or any other input device.

Computing system 202 can also include external data storage 246 coupled to system bus 224. External data storage 246 can be any type or form of storage device or medium capable of storing data and/or other computer-readable instructions. For example, external data storage 246 can be a magnetic disk drive (e.g., a so-called hard drive), a solid state drive, a floppy disk drive, a magnetic tape drive, an optical disk drive, a flash drive, or the like. In some embodiments, the external data storage 246 can comprise disk storage subsystems for the page store 124, the IMRS log 114, and/or the page store log 116.

In-Memory Row Store (IMRS) Detail

Figure 3:
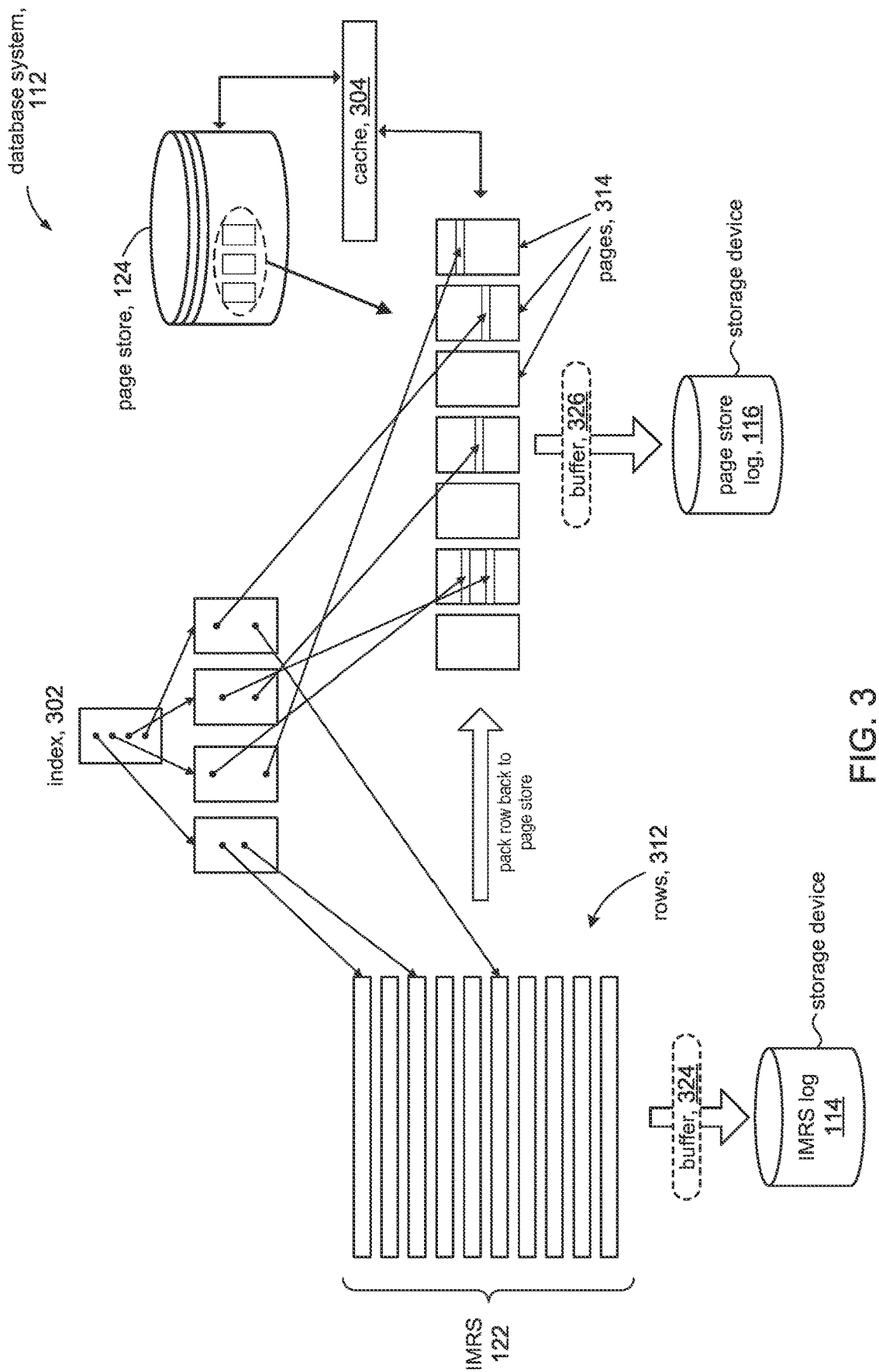
FIG. 3 shows details of the database in accordance with some embodiments.

FIG. 3 illustrates details of database system 112 in accordance with some embodiments. The database system 112 can store its database in the form of data tables, and can comprise an IMRS component 122 and a page store component 124. As explained above, rows in a data table can be stored on a data page in the page store 124. A page-oriented buffer cache 304 can be used to provide fast access to a subset of these pages. The page store 124 can be used to store data tables in the database system 112 that do not require the high availability access (e.g., insert, select, update, delete) that the IMRS 122 can provide. Such data tables can be organized as pages 314 that reside permanently on the disk storage device(s) of the page store 124. The page store 124 can also receive database rows 312 from data tables in the IMRS 122, for example, that have been relocated, or "packed," from the IMRS 122 to the page store because they no longer active.

The IMRS 122, on the other hand, is stored in the main memory (e.g., system memory 214, FIG. 2) and is suitable for data that are active. For example, some users can store data in IMRS 122 for "extreme" online transaction processing (OLTP), which can require processing of high volumes of complex data sets. Other users can store data in IMRS 122 to provide multiversion concurrency control (MVCC), a concurrency control method used to support concurrent access to the database, and so on. The IMRS 122 is row-oriented instead of being page-based, comprising database rows ("rows") 312 that can be uniquely identified by row identifiers (RIDs, not shown). In some embodiments, the IMRS 122 can store a subset of a given data table that is persisted in the page store 124. The subset can be "dynamic" in that the rows of the given data table that are stored in IMRS 122 can vary. For example, a newly-inserted row can be inserted directly into IMRS 122 so that the row is found there, and nowhere else. On the other hand, when an already existing row in a data table is updated, the update is done in the IMRS 122 and not the page store 124 so that a stale copy of the row exists in the page store 124 and a current copy of the row exists in the IMRS 122. Over time, rows in the IMRS 122 can be returned to page store 124 as they become less active.

The database system 112 can include an index 302 that indexes the IMRS 122 and the page store 124. In some embodiments, for example the index 302 can be a B-tree index, but any suitable indexing structure can be used. The index 302 can provide locate any data (e.g., row) required by a database transaction 12, regardless of whether the data is located in the IMRS 122 and/or the page store 124.

FIG. 3 shows that in some embodiments, logging to the IMRS log 114 and the page store log 116 can use buffered I/O. For example, transaction logs can be written to respective buffers 324, 326 before being flushed to the respective storage devices.

Figure 4:
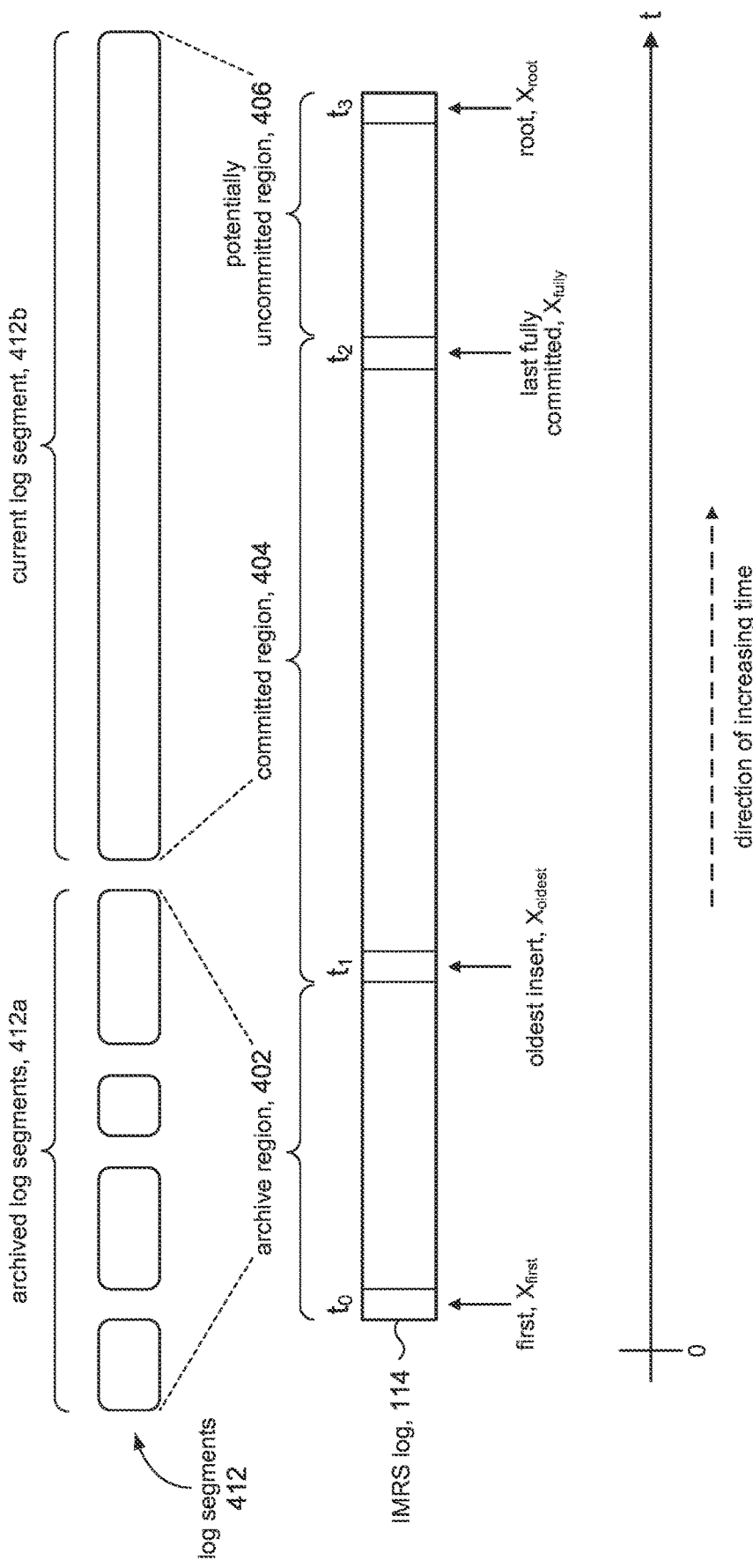
FIG. 4 shows details of a transaction log in accordance with some embodiments.

FIG. 4 illustrates details of the IMRS log 114. In some embodiments, the IMRS log 114 can represent fragments in the database that existed in the IMRS 122. The IMRS log 114 can comprise a set of log segments (dumps) 412. Each log segment 412 corresponds to a period of time for each instance of the IMRS 122, containing logged database transactions made to that instance of the IMRS 122. Separate instances of the IMRS 122 can result, for example, when a crash or database shutdown occurs and the IMRS 122 is re-instantiated during recovery. Archived log segments 412a contain prior logged database transactions made to previous instances of the IMRS 122. FIG. 4, for example, shows that the first transaction $X_{first}$ made in the first instance of the IMRS 122 occurred at time $t_0$. The current log segment 412b contains logs of the database transactions (called transaction blocks) made in the current instance of the IMRS 122. FIG. 4, for example, shows that the first transaction $X_{oldest}$ performed on the current instance of the IMRS 122 occurred at time $t_1$. The 'X' notation will be used to refer to both the database transactions themselves and to their associated transaction blocks.

The IMRS log 114 can be divided into several regions. The archive region 402 represents that portion of the IMRS log 114 that corresponds to the previous instances of the IMRS 122. The committed region 404 and the potentially uncommitted region 406 are regions in the IMRS log 114 that correspond to the current instance of the IMRS 122. The committed region 402 is demarcated by $X_{oldest}$, which represents the earliest transaction made in the committed region 402, and by $X_{fully}$, which represents the last fully committed transaction in the committed region 402. The potentially uncommitted region 406 is demarcated by the first transaction following $X_{fully}$ and the last transaction $X_{root}$ made to the IMRS 122. FIG. 4, shows the direction of increasing time for reference.

The committed region 404 of the IMRS log 114 can represent those transactions that are deemed "fully committed." A transaction that only affects row(s) in the IMRS 122 need only be logged in IMRS log 114. A transaction block is formulated and stored (logged) to a buffer 324 of the IMRS log 114 only after all updates to the database row(s) in the IMRS 122 affected by the transaction are completed. In this way, database transactions are logged in the IMRS log 114 in the same time order as when the database rows are updated. The transaction is considered "fully" committed only when a flush of the buffer 324 to the storage device of the IMRS logs 114 has completed. This means that fully committed transactions are guaranteed to occur in the same time order in the IMRS log 114 as when updates were made to the IMRS 122 by their corresponding database transactions. This kind of logging can be referred to as commit-time, logging. In FIG. 4, the last fully committed transaction $X_{fully}$ represents the point in IMRS log 114 up to which the log is known to be fully consistent.

A transaction that makes changes only to the page store 124 is logged only in the page store log 116. In various embodiments, the page store log 116 employs a conventional technique referred to as write-ahead logging (WAL), whereby the transaction log is first flushed to disk before the changed (or, in technical terms, "dirty") page is written to disk. Due to the physical nature of storage of multiple rows in the page store 124, and the fact that different transactions can be changing different data rows on the same page, coupled with WAL protocols, we end-up with what is commonly referred to as an unordered sequence of changes written to the page store log 116. By "unordered" we mean change(s) that were done to row-B *after* changes were done by some other concurrently executing transaction to row-A (from the same table), may end up with log records in the for row-B appearing *before* log records for row-A in the page store log 116.

A transaction, referred to as a cross-log transaction, may make changes to row(s) in the IMRS 122 and to pages in the page store 124. Changes to IMRS 122 would be logged in IMRS log 114 and changes to the page store 124 would be logged in page store log 116. As with non cross-log transactions, the commit of a cross-log transaction is done by flushing the IMRS log 114 and the page store log 116, which can occur asynchronously. In accordance with some embodiments, a cross-log transaction that is logged in the IMRS log 114 is considered "fully" committed only when the flush of both logs has completed. In some embodiments, the transaction logs in IMRS log 114 and in page store log 116 for cross-log transactions are tied together; for example, by sharing a session identifier of the cross-log transaction between the logs.

The potentially uncommitted region 406 of the IMRS log 114 can contain those transactions that are not deemed fully committed; in other words, are "uncommitted." An uncommitted non cross-log transaction can be a transaction in which not all the rows in the IMRS 122 that are targeted by the transaction have completed, or if completed, where the buffer of the IMRS log 114 is not fully flushed. Likewise, in the case of a cross-log transaction, the transaction is uncommitted if data updates in either or both the IMRS 122 and the page store 124 are still in progress, or if completed, where the buffers for either or both the IMRS log 114 and the page store log 116 have not fully flushed.

Figure 5:
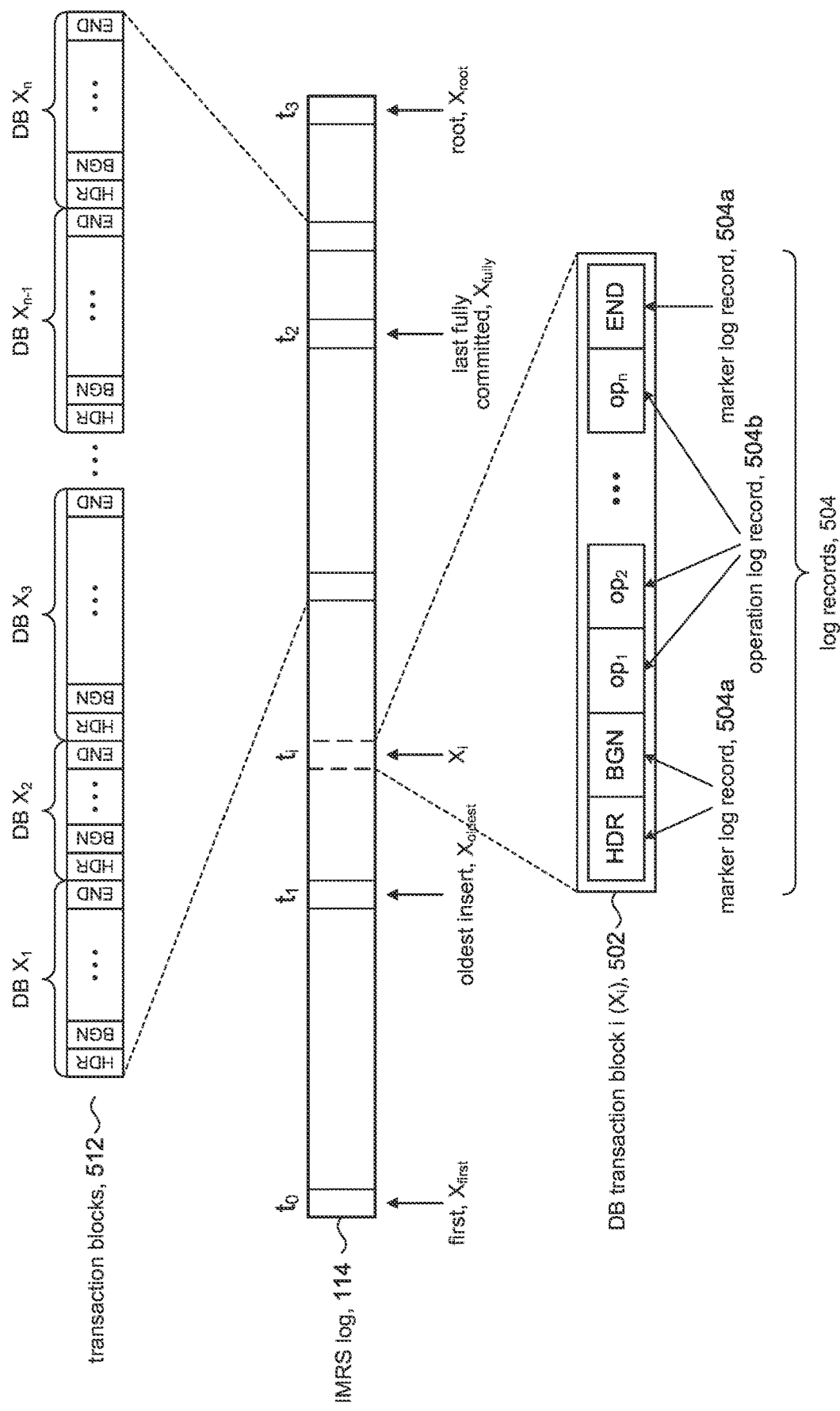
FIG. 5 shows details of a transaction block in accordance with some embodiments.

FIG. 5 shows details a transaction block in accordance with some embodiments. Transactions are logged in the IMRS log 114 in units called transaction blocks 502. A transaction block 502 for transaction $X_i$ can comprise a set of log records 504. Marker log records 504a demarcate one transaction block 502 from another. Operation log records 504b correspond to the operations that comprise the transaction. In accordance with some embodiments, the log records 504 are ordered in time. For example, a header (HDR) marker log record is the first (earliest in time) log record written into the transaction block. The next log record is a begin (BGN) marker log record, followed by one or more operation log records 504b. Each operation log record 504b is written in the same order time wise as the operation is performed on the IMRS 122. The last log record (latest in time) in the transaction block 502 is an end (END) marker log record. FIG. 5 shows an example of an arbitrary set of transaction blocks 512 in the IMRS log 114 associated with transaction DB $X_1$ to DB $X_n$, where the transaction block for transaction DB $X_1$ occurs earlier in time than the transaction block for transaction DB $X_2$, the transaction block for transaction DB $X_2$ occurs earlier in time than the transaction block for transaction DB $X_3$, and so on. Note that the size of the transaction block (i.e., number of operation log records 504b) can vary from one to another depending on the number of operation logs for the associated transaction.

Recovery Processing

The discussion will now turn to processing to recover data in the IMRS 122. Recovery processing is typically associated with a system crash to recover the IMRS 122. However, recovery processing called "load database recovery" can be performed to load a backup copy of a previously "dumped" database. A recovery process call "load transaction recovery" can be performed to load a backup copy of a previously dumped transaction log.

Online database recovery is a process of recovering a previously dumped database (load database recovery) along with recovering zero or more previously dumped transaction logs, and then marking the database available for public use. For example, load database recovery restores the database, but otherwise indicates the database is offline. In some embodiments, performing an "online database" operation can simply involve turning on a status bit to indicate the database is now online.

Figure 6:
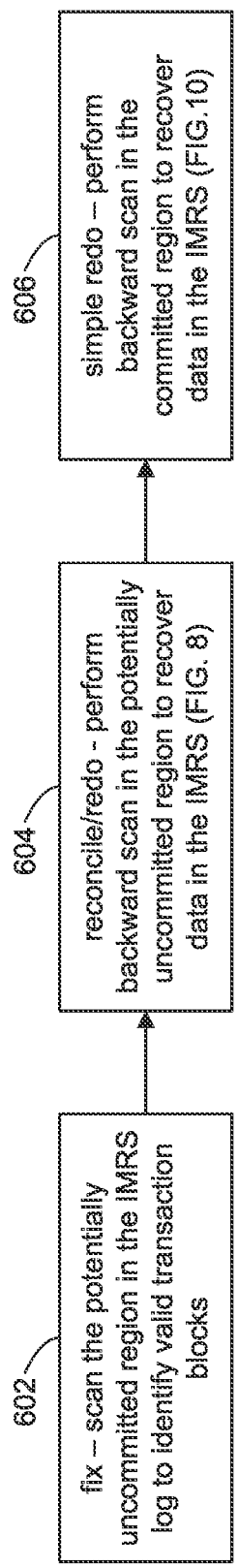
FIGS. 6 and 7 illustrate a high level flow of backward scanning in accordance with some embodiments.
Figure 7:
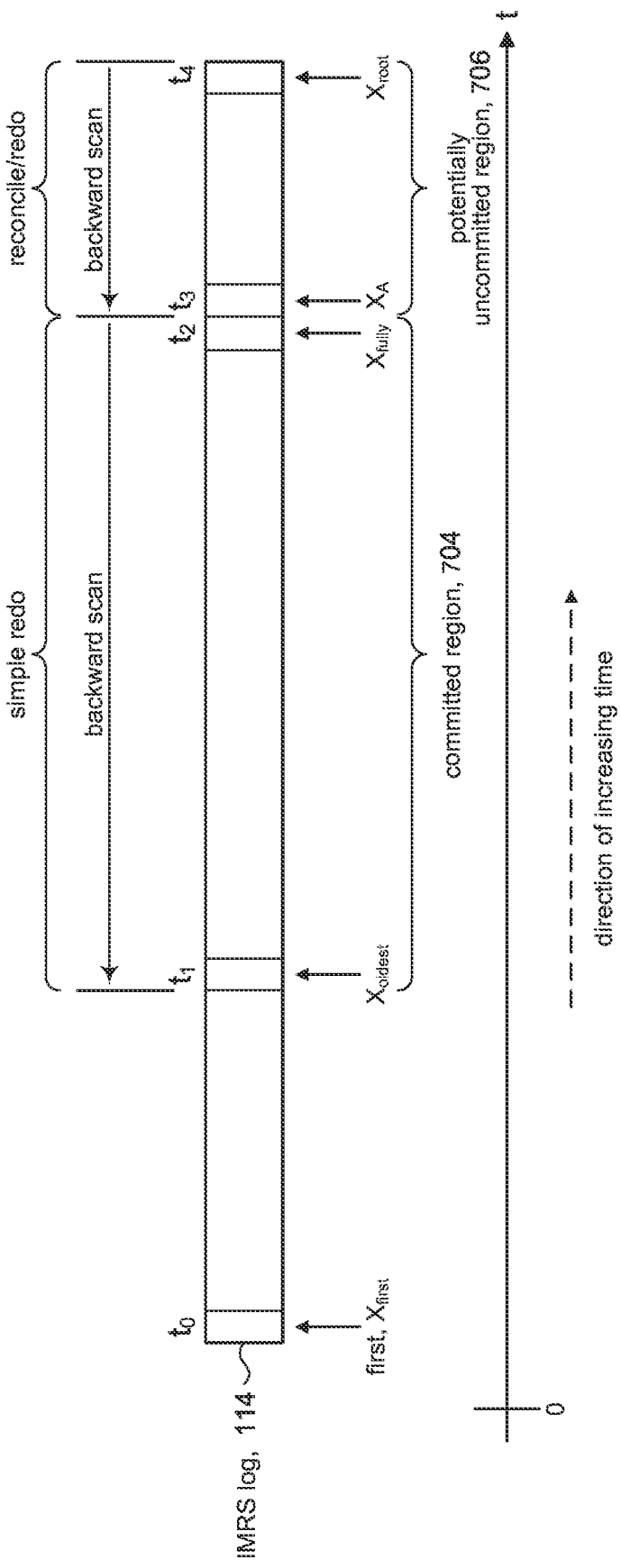

Referring to FIG. 6, the discussion will now turn to a high level description of processing in the recovery processing module 104 for recovering data in the IMRS 122 after a system crash in accordance with the present disclosure. In some embodiments, for example, the recovery processing module 104 may include computer executable program code, which when executed by a computer system (e.g., 100, FIG. 1, 202, FIG. 2), may cause the computer system to perform the processing in accordance with FIG. 6. The flow of operations performed by the computer system is not necessarily limited to the order of operations shown. Reference will be made to FIG. 7 in the following description, showing details of an example of the IMRS log 114 to illustrate the discussion.

At operation 602, the computer system can begin recovery processing by fixing the transaction blocks in the potentially uncommitted region (706, FIG. 7) of the IMRS log 114; this can be referred to as the "fix phase" of recovery. As explained above, the potentially uncommitted region 704 can comprise a mixture of valid committed transactions and invalid (uncommitted, or incomplete) transactions. In some embodiments, the computer system can scan the transaction blocks in the potentially uncommitted region 704, starting from the first transaction block ($X_A$ at time $t_3$) that immediately follows the last fully committed transaction block ($X_{fully}$) in a time wise increasing direction to the last transaction block in the potentially uncommitted region ($X_{root}$), to identify invalid transaction blocks. In some embodiments, invalid transaction blocks can include transaction blocks whose associated transactions have not completed in terms of updating the IMRS 122. At the time of the crash, the potentially uncommitted region will contain a combination of valid and invalid transaction blocks. The fix phase "fixes" transaction blocks in the potentially uncommitted region by linking together only those transaction blocks whose associated transactions are complete and committed, for example, thus defining a list of valid transaction blocks.

At operation 604, the computer system can recover data in the IMRS 122 by scanning the fixed, and therefore now valid, transaction blocks in the potentially uncommitted region of the IMRS log 114; this can be referred to as the "reconcile/redo phase" of recovery. In this phase, the final committed state of a valid cross-logged transaction block is determined by consulting the state of the transaction in the syslogs leg. The IMRS leg of a cross-log transaction is deemed complete and committed if and only if the syslogs leg of the transaction is committed. This aspect of determining the final committed state of a valid transaction block in the IMRS log by cross-check the transactions' state in syslogs is what is meant by "Reconcile-Redo" phase.

In accordance with the present disclosure, the computer system can process each transaction block in the list of valid transaction blocks by scanning the list in reverse chronological order (backward scan), starting from the last log record in a latest transaction block that is latest in time and ending with the first log record in an earliest transaction block that is the earliest in time. Merely as an illustrative example, a backward scan would be to start from the transaction block $X_{root}$ at time $t_4$ and end with transaction block $X_A$ at time $t_3$ (<$t_4$). Details of this aspect of the recovery process are discussed below.

At operation 606, the computer system can continue recovering data in the IMRS 122 by scanning the transaction blocks in the committed region 704 of the IMRS log 114; this can be referred to as the "simple redo phase" of recovery. In accordance with the present disclosure, the computer system can process each transaction block in the committed region 704 by scanning the transaction blocks in reverse chronological order (backward scan), starting from the last log record in the last transaction block, namely $X_{fully}$ at time $t_2$ (the latest transaction block) and ending with the first log record in the oldest (earliest) transaction block, namely $X_{oldest}$ at time $t_1$. In this region, all transactions are fully committed, so the fix phase described above need not be performed. Details of this aspect of the recovery process are discussed below.

Figure 8:
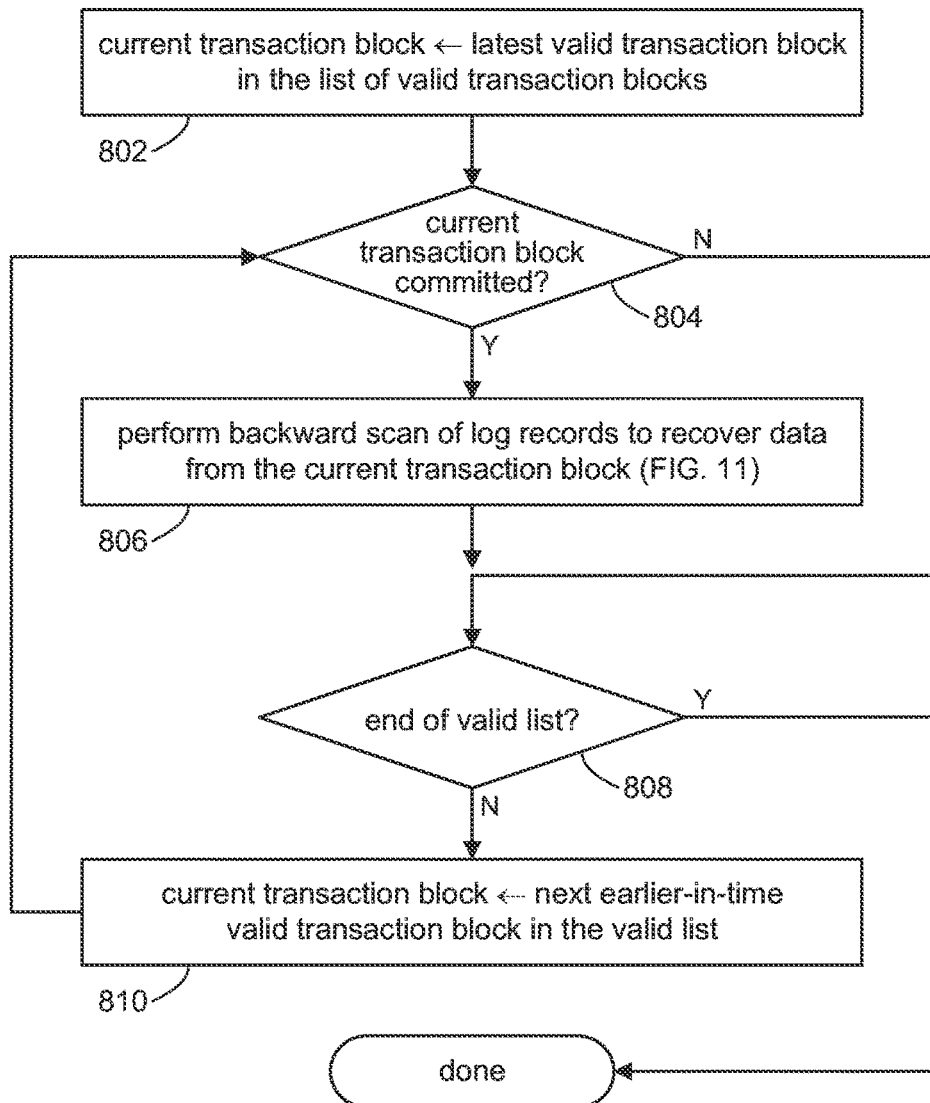
FIGS. 8 and 9 illustrate a high level flow of reconcile/redo processing in accordance with some embodiments.
Figure 9:
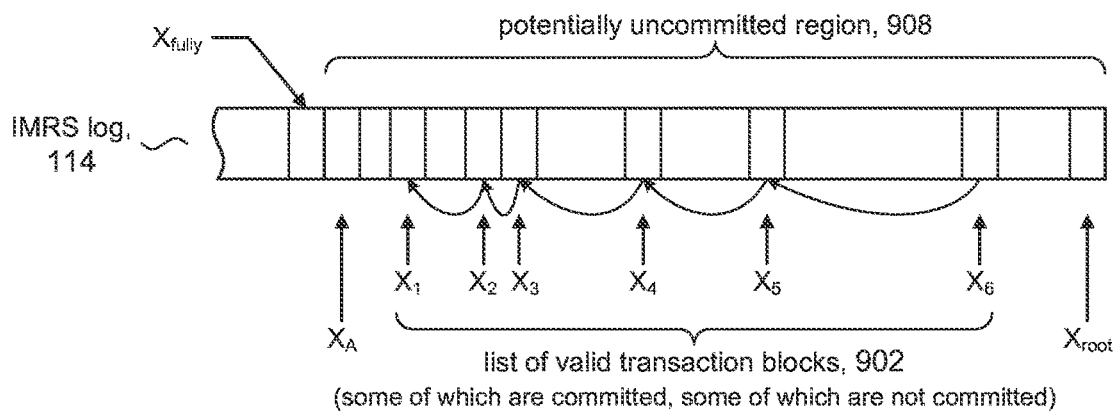

Referring to FIG. 8, the discussion will now turn to a high level description of processing in the recovery processing module 104 for performing the reconcile/redo phase, discussed above in operation 604, in accordance with the present disclosure. In some embodiments, for example, the recovery processing module 104 may include computer executable program code, which when executed by a computer system (e.g., 100, FIG. 1, 202, FIG. 2), may cause the computer system to perform the processing in accordance with FIG. 8. The flow of operations performed by the computer system is not necessarily limited to the order of operations shown. Reference will be made to FIG. 9 in the following description, showing details of an example of the potentially uncommitted region 908 of IMRS log 114 and the valid list 902 to illustrate the discussion.

At operation 802, the computer system can start the process by setting a first transaction block from the list 902 of valid transaction blocks (valid list determined at operation 602) as the current transaction block to be processed. As explained above, the valid list 902 is scanned in reverse chronological order, so that processing begins with the transaction block that is latest in time, which in the example is transaction block $X_6$. Thus, the current transaction is set to transaction block $X_6$ as the first transaction block from the list 902.

At operation 804, the computer system can determine whether the current transaction block, which is valid, is also fully committed. In our example, the current transaction block at this point is transaction block $X_6$. Where the transaction associated with transaction block $X_6$ only operates on row(s) in the IMRS 122, then the transaction block $X_6$ is deemed fully committed when the buffer for the IMRS log 114 is fully flushed. If the transaction operates on row(s) in the IMRS 122 and on data in the page store 124, then the transaction block $X_6$ is deemed fully committed when both the buffer for the IMRS log 114 and the buffer for the page store log 116 are fully flushed. Processing can proceed to operation 806 in the case of a fully committed transaction block, and to operation 808 otherwise.

At operation 806, the computer system can recover data for one or more rows in the IMRS 122 affected by the transaction associated with the current transaction block. In accordance with the present disclosure, the computer system can process each log record in the current transaction block by scanning the log records in reverse chronological order (backward scan), starting from a latest log record that is latest in time and ending with an earliest log record that is the earliest in time. This aspect of the present disclosure is discussed below.

At operation 808, the computer system can determine whether we are at the end of the list of valid transaction blocks. If so, the recovery processing to recover data from the potentially uncommitted region of the IMRS log 114 can be deemed complete. If there are more transaction blocks in the list of valid transaction blocks to process, the processing in the computer system can proceed to operation 810.

At operation 810, the computer system can set the current transaction block to the next transaction block in the valid list in reverse chronological order, namely the next earlier-in-time transaction block in the valid list. At this point in our example that would be transaction block $X_5$. The computer system can return to operation 804 to repeat the process of recovering data with the newly set current transaction block. The reconcile/redo process is thus performed on each transaction block in the valid list 902 in reverse chronological order, namely $X_6, X_5, X_4, X_3, X_2, X_1$.

Figure 10:
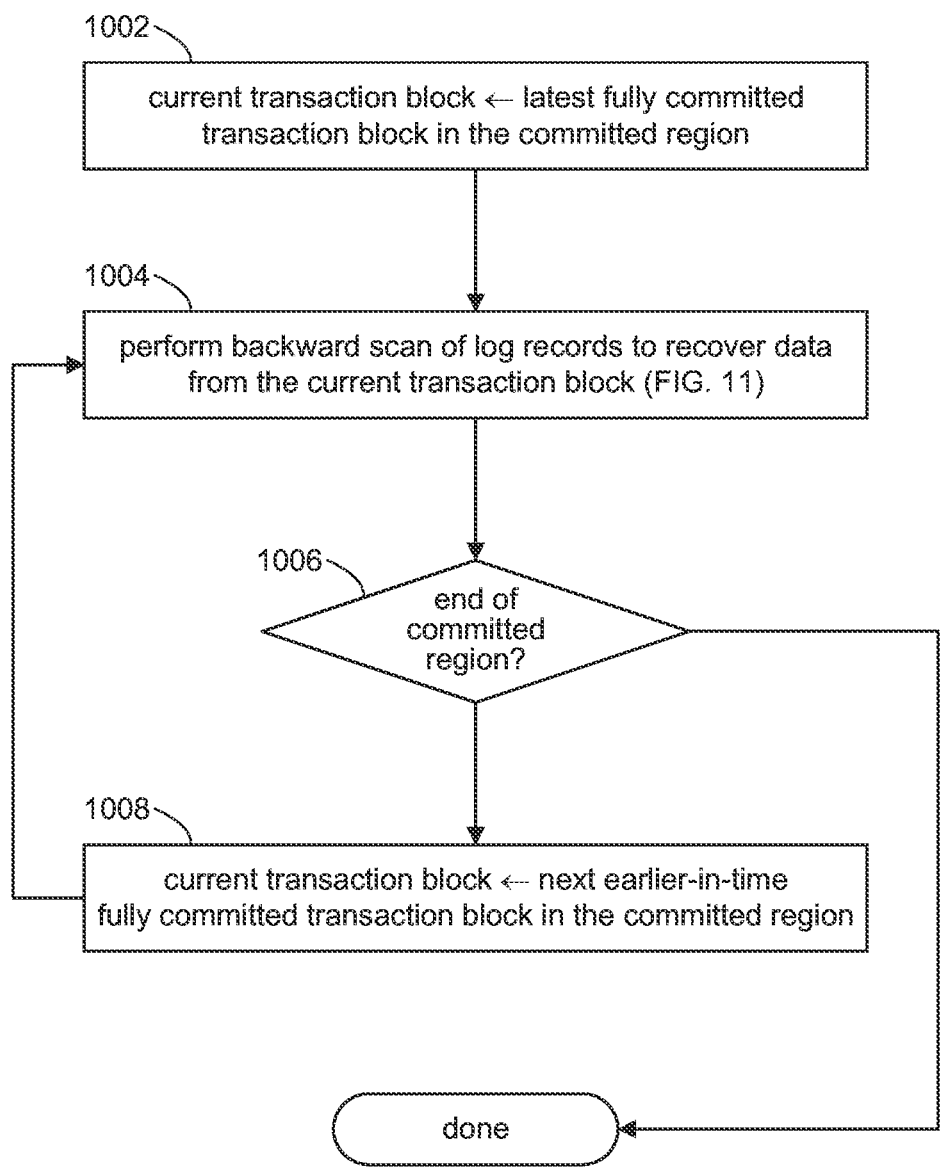
FIG. 10 illustrates a high level flow of simple redo processing in accordance with some embodiments.

Referring to FIG. 10, the discussion will now turn to a high level description of processing in the recovery processing module 104 for performing the simple redo phase, discussed above in operation 606, in accordance with the present disclosure. In some embodiments, for example, the recovery processing module 104 may include computer executable program code, which when executed by a computer system (e.g., 100, FIG. 1, 202, FIG. 2), may cause the computer system to perform the processing in accordance with FIG. 10. The flow of operations performed by the computer system is not necessarily limited to the order of operations shown. Reference will be made back to FIG. 7 in the following description to illustrate the discussion.

At operation 1002, the computer system can start the process by setting a transaction block in the committed range 704 as the current transaction block to be processed. As explained above, the committed range 704 is scanned in reverse chronological order, so that processing begins with the transaction block that is latest in time, namely transaction block $X_{fully}$. Accordingly, the current transaction is set to transaction block $X_{fully}$ as the first transaction block in the committed range 704 to be processed. As all transactions in this committed region are known to be committed, even for any cross-log transaction no cross-check of the transaction's committed state on the syslogs leg is needed here. Hence this phase is referred to as "Simple-Redo" phase (i.e. no reconciliation is needed).

At operation 1004, the computer system can recover data for one or more rows in the IMRS 122 affected by the transaction associated with the current transaction block. In accordance with the present disclosure, the computer system can process each log record in the current transaction block by scanning the log records in reverse chronological order (backward scan), starting from a latest log record that is latest in time and ending with an earliest log record that is the earliest in time. This aspect of the present disclosure is discussed below.

At operation 1006, the computer system can determine whether we are at the end of the committed region 704 of the IMRS log 114. If so, the recovery processing to recover data from the committed region 704 can be deemed complete. If there are more transaction blocks to process, the processing in the computer system can proceed to operation 1008.

At operation 1008, the computer system can set the current transaction block to the next transaction block in the committed region 704 in reverse chronological order. At this point in our example that would be the transaction block immediately preceding $X_{fully}$. The computer system can return to operation 1004 to repeat the process of recovering data with the newly set current transaction block. Since transactions blocks in the committed region 704 are by definition fully committed, the simple redo process is performed on each transaction block in the committed region 704, albeit in reverse chronological order, starting from $X_{fully}$ and ending with $X_{oldest}$.

Figure 11:
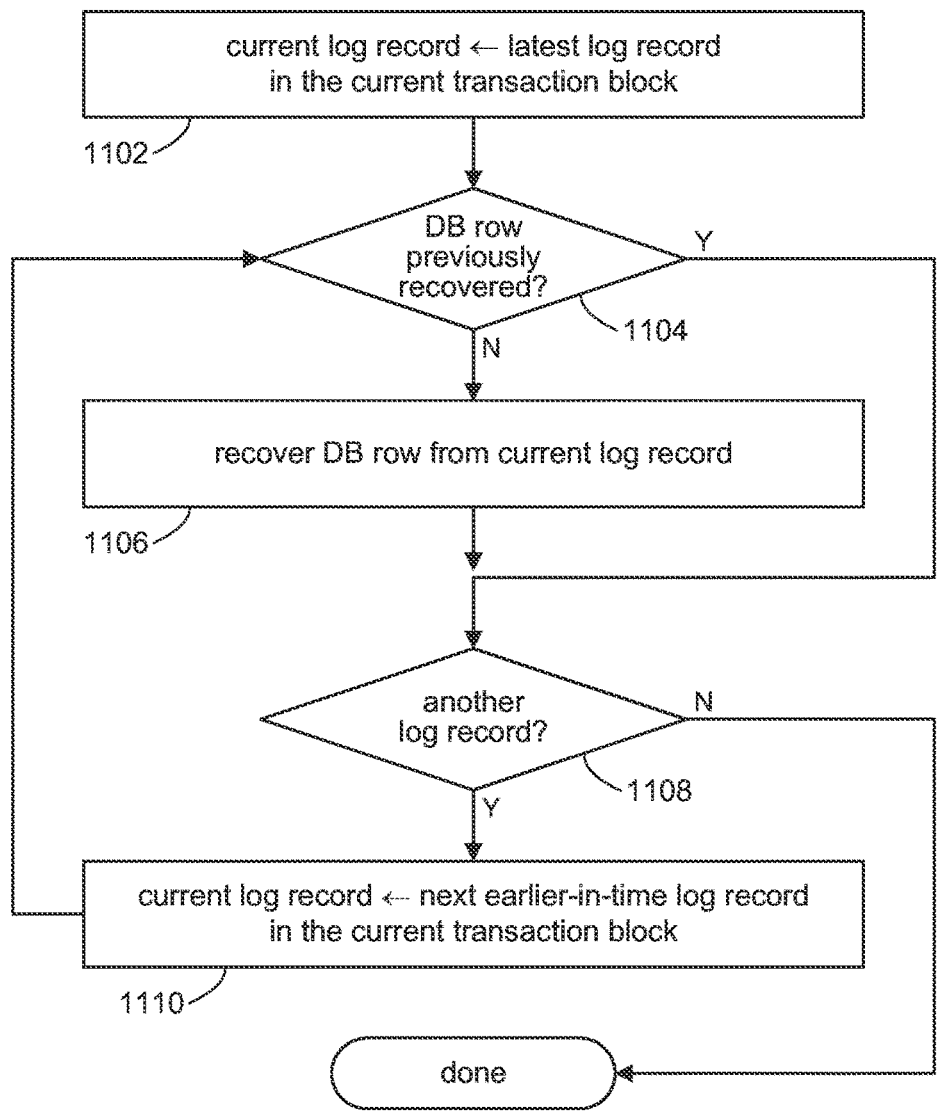
FIGS. 11 and 12 high level flow of backward scanning of log records in a transaction block in accordance with some embodiments.
Figure 12:
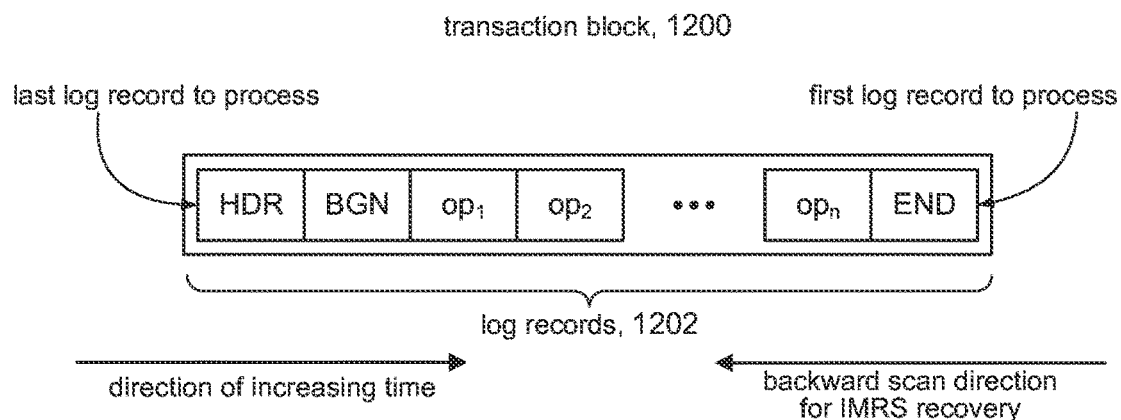

Referring to FIG. 11, the discussion will now turn to a high level description of processing in the recovery processing module 104 for performing the simple redo phase, discussed above in operation 606, in accordance with the present disclosure. In some embodiments, for example, the recovery processing module 104 may include computer executable program code, which when executed by a computer system (e.g., 100, FIG. 1, 202, FIG. 2), may cause the computer system to perform the processing in accordance with FIG. 10. The flow of operations performed by the computer system is not necessarily limited to the order of operations shown. Reference will be made to FIG. 12 in the following description to illustrate the discussion, showing details of a transaction block.

At operation 1102, the computer system can start the process by setting a log record in the target transaction block as the current transaction block to be processed in order to recover data for one or more rows in the IMRS 122 affected by the transaction. As explained above, the log records are scanned in reverse chronological order, so that processing begins with the last (latest-in-time) log record. FIG. 12 shows a transaction block 1200, showing the log records 1202 written in order of increasing time starting with a HDR marker log record, then a BGN marker log record, operation log records $op_1$-$op_n$, and terminating with an END marker log record. Accordingly, the current log record is set to the END marker log record as the first log record to be processed.

At operation 1104, the computer system can determine if the database row associated with the current log record has been previously recovered. In some embodiments, for example, the computer system can maintain a lookup table (not shown) of row IDs of recovered database rows, referred to herein as a RID map. The computer system can search the RID map for the RID associated with the current log record.

If the RID is not found in the RID map, that can mean the database row has not been previously recovered and processing of the current log record can continue at operation 1106; otherwise, the computer system can skip processing of the current log record and can continue to operation 1108.

At operation 1106, the computer system can recover the database row from the current log record. Details for data recovery for the different log records are discussed below. In some embodiments, a hash table can be used to accelerate recovery performance. For example, when a database row is recovered its RID can be added to the hash table. The RID map referred to in operation 1104 can be this hash table. The determination made in operation 1104 can be accelerated by checking for the presence/absence of the RID in the hash table.

At operation 1108, the computer system can determine if there is another log record to process. If not, recovery processing to recover data from the transaction block 1200 can be deemed complete. If there are more log records to process, the processing can continue with operation 1110.

At operation 1110, the computer system can set the current log record to the next earlier log record in reverse chronological order. At this point in our example, that would be the operation log record $op_n$. The computer system can return to operation 1104 to repeat the process of recovering data with the newly set current log record. The process can continue for operation log records $op_{n-1}$, $op_{n}-2$, ... $op_2$, $op_1$. In accordance with some embodiments, the BGN marker log record can be the last log record to process.

Log Record Examples

The discussion will now turn to a description of log records generated for various data manipulation language (DML) operations affecting database rows in the IMRS 122 associated with some illustrative examples of database transactions.

Figure 13:
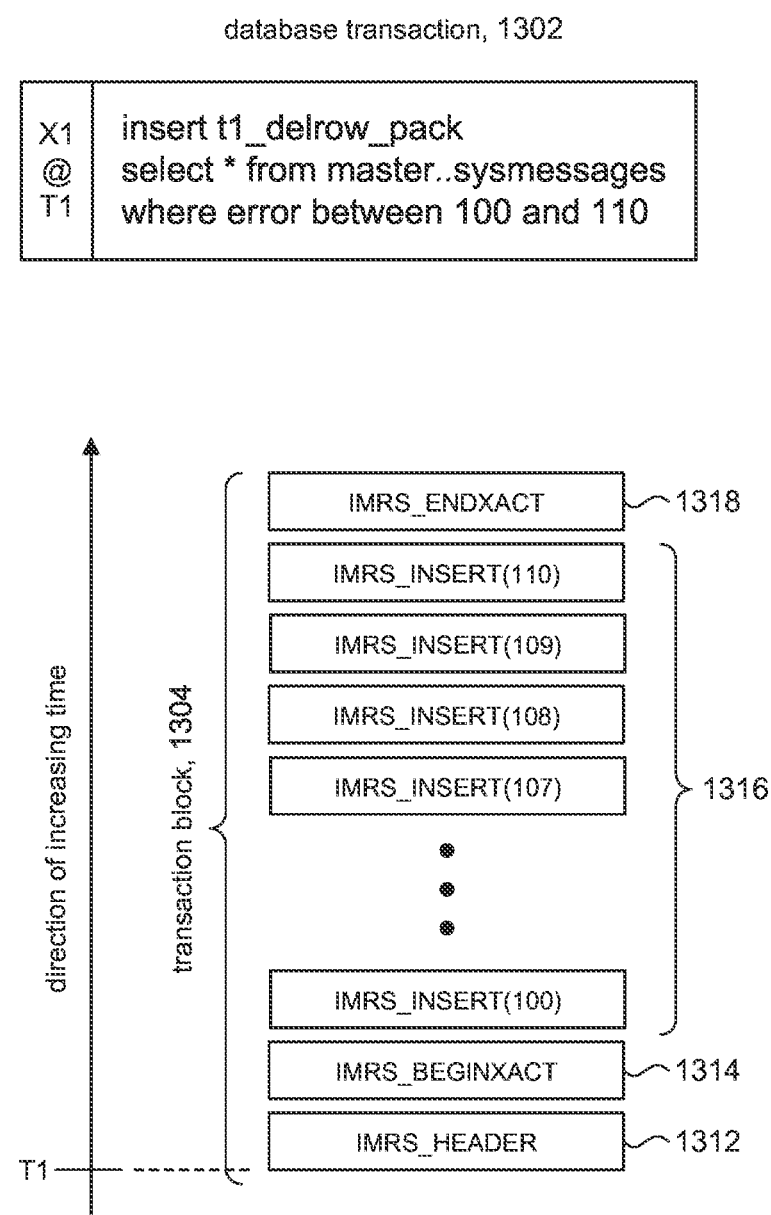
FIGS. 13, 14, and 15 illustrate examples of database transactions and corresponding transaction blocks.

FIG. 13 shows a database transaction (X1) 1302 made at time T1, and the corresponding transaction block 1304 of log records comprising associated DML operations. The HDR marker log record 1312 (IMRS_HEADER) can include control information such as a session ID for the transaction, information about each row affected by the database transaction 1302, and so on. The BGN marker log record 1314 (IMRS_BEGINXACT) can signify start of a block of log records for a transaction. The BGN marker log record 1314 can include a session ID of the database transaction 1302 in the page store log 116 in the case of cross-log transactions. The END marker log record 1318 (IMRS_ENDXACT) can signify the end of a block of log records for a transaction. The operation log records 1316 can include IMRS_INSERT, IMRS_PURGE, and IMRS_PURGED_ROWS, although FIG. 13 only shows IMRS_INSERT log records.

An IMRS_INSERT log record is used when a row is inserted into the IMRS 122, and can include information such as the RID of the affected database row and contents of the row being inserted (although not shown in the example). The database transaction 1302 affects database rows 100-110 in the IMRS 122.

An IMRS_PURGE log record is used when a row is purged (removed) from the IMRS 122, and can include the RID of the purged row. The database row can be moved (or "packed") back to the page store 124.

An IMRS_PURGED_ROWS log record can be written to record a number of rows from one table that are purged from the IMRS 122. The log record can contain the RIDs of the rows that are purged. This log record may be logged as part of massive purge (such as from some utility operations, or dropping a user table).

The IMRS_PURGE and IMRS_INSERT log records can occur in pairs when a row is updated in the IMRS 122. When an update of a row happens in the IMRS 122, for example, a new row version with the updated row can be created and linked to the row header. Upon commit, a pair of IMRS_PURGE and IMRS_INSERT records will be logged for the update of the row. The IMRS_INSERT will have a status bit indicating that it is logged for an update, and it will contain the new row data.

Figure 14:
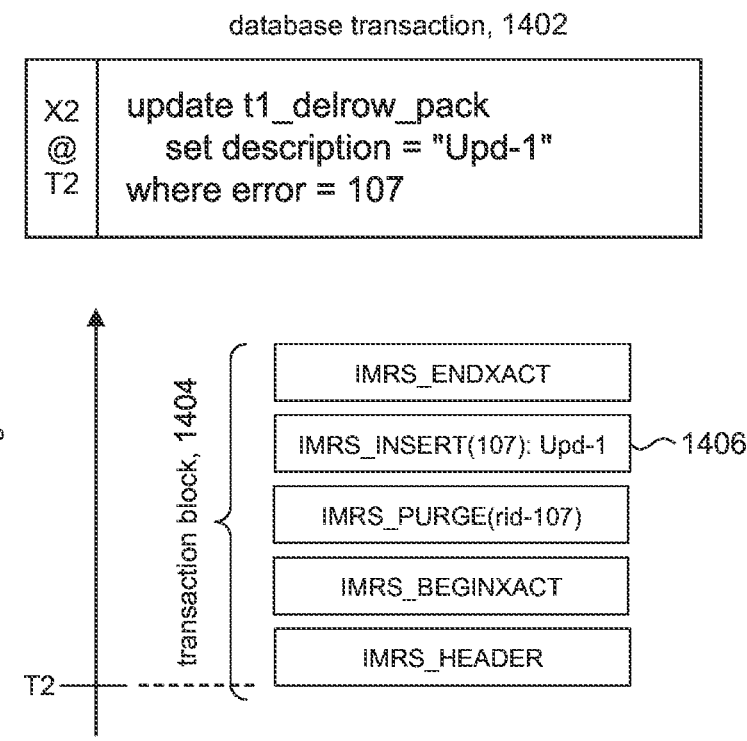
Figure 15:
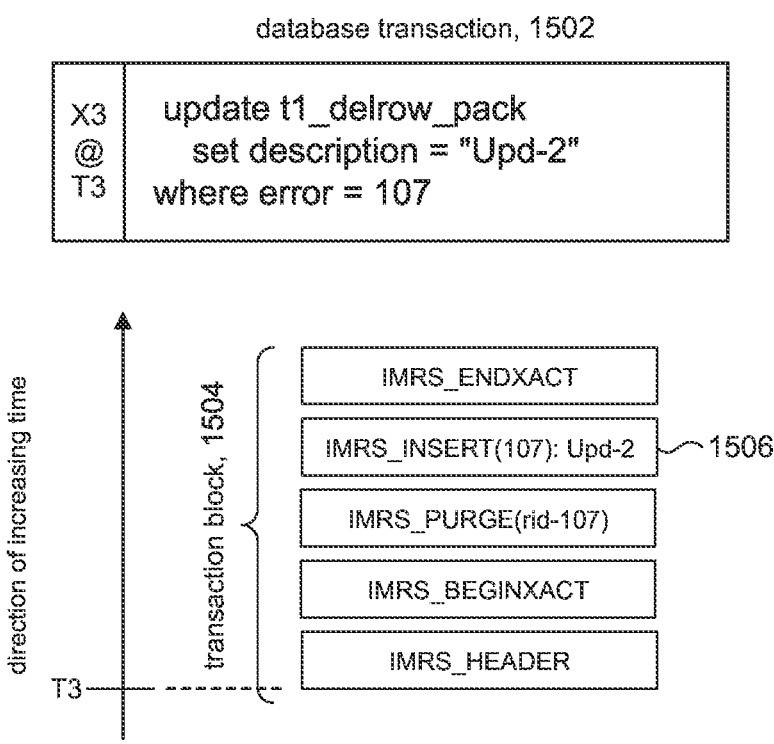

The database transaction X1 will create rows 100-110 in the IMRS 122 at time T1. FIG. 14 shows a database transaction (X2) 1402 made subsequent to the database transaction X1 at time T2>T1, showing the transaction block 1404 for an update (Upd-1) made to database row 107, which can include updates made to one or more data fields that comprise the database row. In some embodiments, the IMRS_INSERT log record 1406 can include a copy of the entirety of database row 107 representing the current state of the database row after update Upd-1 was made. FIG. 15 shows yet another a database transaction (X3) 1502 made subsequent to the database transaction X2 at time T3>T2, showing the transaction block 1504 for another update (Upd-2) made to database row 107; and the IMRS_INSERT log record 1506 can include a copy of the entirety of database row 107 representing the state of the database row after update Upd-2 was made.

Recovering Database Rows From Log Records

Figure 16:
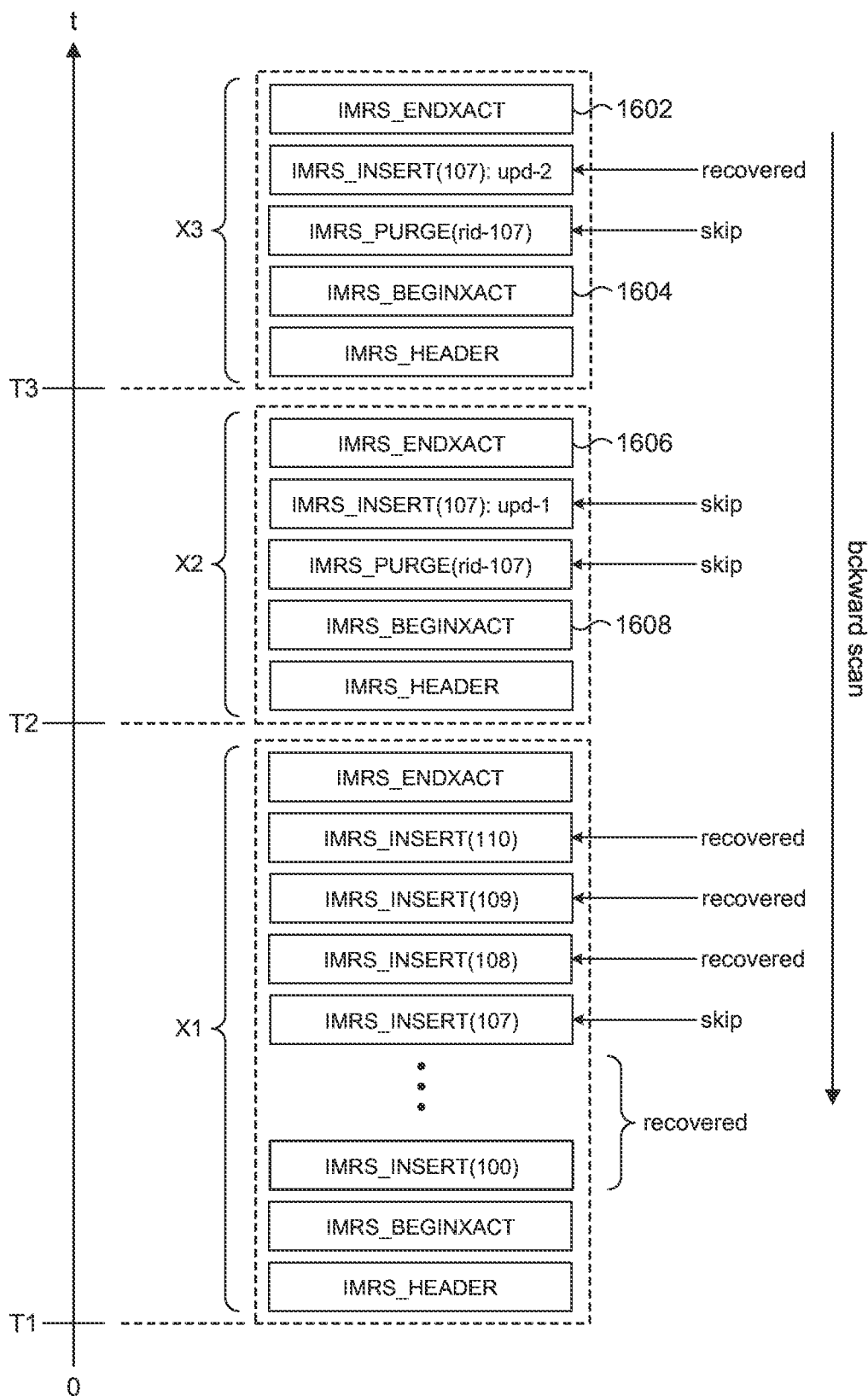
FIG. 16 illustrates a segment of the IMRS log comprising the transaction blocks from FIGS. 13-15.

FIG. 16 shows a portion of the IMRS log 114 comprising the log records from the sequential execution of transaction blocks X1, X2, X3 from FIGS. 13-15 arranged along a common timeline. As explained above, a backward scan of the IMRS log 114 in accordance with the present disclosure includes a backward scan of the transaction blocks, which includes processing transaction block X3, then transaction block X2, then transaction block X1. Moreover, the log records comprising a transaction block are also processed by backward scanning Putting it all together, a backward scan in accordance with the present disclosure of the portion of the IMRS log 114 comprising the transaction blocks X1, X2, X3 includes processing the log records of transaction block X3 in reverse chronological order, starting with the IMRS_ENDXACT log record 1602 and ending with the IMRS_BEGINXACT log record 1604, then processing the log records of transaction block X2 in reverse chronological order, starting with the IMRS_ENDXACT marker log record 1606 and ending with the IMRS_BEGINXACT marker log record 1608, and so on.

The data recovery process varies for each kind (marker vs. operation) of log record and for each type of operation log record. A log record can be associated with a database row that is affected by the corresponding operation.

A. IMRS_ENDXACT

This log record signals a completed transaction. Recovery includes re-creating a XIMRS, which is an in-memory representation of an active transaction, to reflect the state of a transaction being recovered in the IMRS 122. As transactions are "seen" in reverse order of completion, this XIMRS is prepended to the queue of XIMRS's maintained in XID-order queue, so that upon completion of the log scan, the XIMRS for the oldest transaction appears at the head of the queue. The log records IMRS_BEGINXACT (discussed below) and IMRS_ENDXACT are placeholder log records for the begin and end of a transaction. The backwards scan recovery process can use these log records to maintain metadata information for transactions that are recovered.

B. IMRS_PURGE

This log record represents a pack operation when the database row is removed from the IMRS 122 and moved back to the page store 124. The computer system can maintain a lookup table (not shown) to track purged rows (e.g., by their RID), referred to herein as a RID-hash table. The database row can undergo more that one sequence of a purge followed by a re-insert to the IMRS 122, eventually ending with a final purge operation when the row is finally removed from the IMRS 122. If this database row already exists in the RID-hash table (vis-á-vis its RID), that means the row was purged from the IMRS 122, and therefore, no further recovery is needed. If this database row does not appear in the RID-hash table, that means this is the final purge of the row from the IMRS 122, and its RID can be recorded in the RID-hash table to record that this row was eventually removed from the IMRS.

C. IMRS_PURGED_ROWS

This log record represents a bulk-purge operation, e.g. a DROP TABLE operation, a TRUNCATE TABLE operation, and so on, where rows are purged in bulk from the IMRS 122. The IMRS_PURGED_ROWS log record carries with it the list of row-IDs of the rows that were bulk-purged. This type of operation log record can be processed in the same way as for IMRS_PURGE, with an additional iteration around each affected RID tracked by this log record.

D. IMRS_INSERT

For insert operations, the recovery processing can differ depending on the order of inserts:
  Multiple insert log records may be seen for the same row when the row is updated multiple times in the IMRS 122.
  A series of one or more inserts may be followed by an IMRS_PURGE log record when the row is purged from the IMRS 122, or an IMRS_PURGED_ROWS log record tracking this row, when the row is removed from the IMRS 122 due to a utility such as DROP TABLE or TRUNCATE TABLE that removes the partition/table from the database.
  An IMRS_INSERT marked with INS_FOR_DELETE signals the deletion of the row from the IMRS 122.
The recovery processing is handled as follows:
  If the insert is for a delete operation (INS_FOR_DELETE), ignore this log record as the row is (was) deleted from the IMRS 122. Add the RID to the RID map.
  Check if the RID is already found in the RID-hash table. If found, it means this row was subsequently purged or bulk-purged from the IMRS 122, so the prior insert operation(s) is (are) not interesting. Skip processing of (discard) this log record.
  If not found in the RID-hash table, check if the row has been previously recovered, by looking up the RID-map lookup table. If so then we can skip processing of (discard) this log record, as it is being over-written by a later update (insert). If the row has not been previously recovered, then insert the row to the IMRS 122 as this is the latest version of the row that needs to be retained and add the RID to the RID map.

E. IMRS_BEGINXACT

This log record provides a hook to manage the XIMRS. If no new row versions were "created" in this transaction, i.e., no new row versions are found hanging off of the XIMRS, it can be torn down as part of the processing for this log record. If any new row versions were recovered in this backward scan, the XIMRS representing this recovered transaction block is tracked in-memory for book-keeping.

Referring again to FIG. 16, when performing crash recovery, the IMRS 114 is initially empty. Backward scan processing of the transaction blocks X1, X2, X3 would first process transaction block X3. When the log record IMRS_INSERT(107): upd-2 is encountered, database row 107 with the content of "Upd-2" will be created in IMRS 122, thus recovering database row 107 in accordance with the log record. Processing of the next earlier-in-time log record IMRS_PURGE(rid-107) is skipped since database row 107 has been previously recovered.

When processing continues to the next earlier-in-time transaction block X2, processing of the log record IMRS_INSERT(107): upd-1 will be skipped, because database row 107 has been previously recovered. Likewise, processing of the log record IMRS_PURGE(rid-107): upd-1 will be skipped, again because database row 107 has been previously recovered.

When processing continues to the next earlier-in-time transaction block X1, the log records IMRS_INSERT(110), IMRS_INSERT(109), IMRS_INSERT(108) will be processed in the order shown (reverse chronological order) to create database rows 110, 109, and 108 in IMRS 122, thus recovering database rows 110, 109, and 108 in accordance with their respective log records. Processing of the log record IMRS_INSERT(107), however, will be skipped since database row 107 has been previously recovered.

Figure 17:
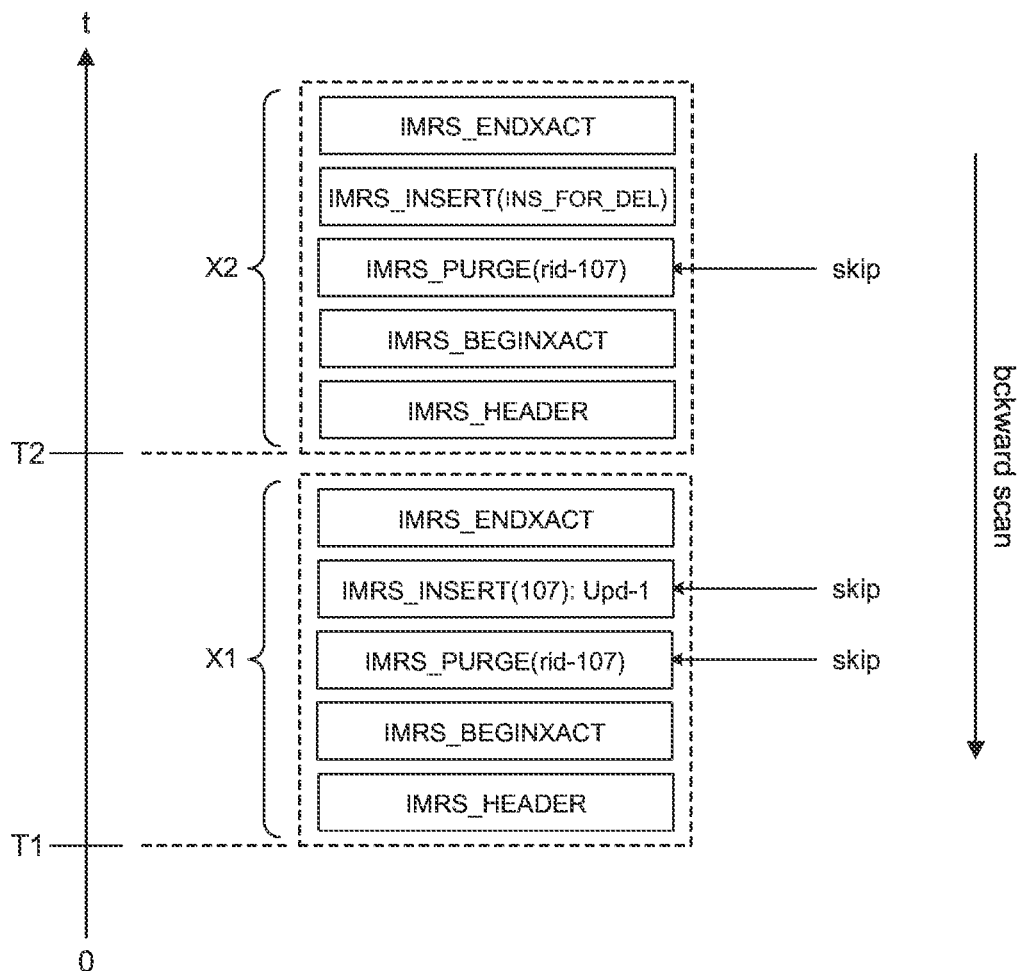
FIG. 17 illustrates another example of an IMRS log segment comprising transaction blocks.

FIG. 17, illustrates recovery processing when a row is deleted. At time T1, the transaction block X1 is logged, indicating the database row 107 was inserted into the IMRS 122 and updated with content "Upd-1". At time T2>T1, the transaction block X2 is logged, indicating that the database row 107 has been deleted from the IMRS 122.

During crash recovery, backward scan will first process transaction block X2. Data recovery in accordance with the log record IMRS_INSERT(INS_FOR_DEL) will not change the state of the IMRS 122 (i.e., no database row is added) because the operation is a delete operation. The row id for database row 107 can be added to the RID map to indicate this row has been previously "recovered." Processing of the next earlier-in-time log record IMRS_PURGE (rid-107) can be skipped since it is deemed to have been previously recovered. Continuing with the next earlier-in-time transaction block X1, processing of the log records IMRS_INSERT(107): Upd-1 and IMRS_PURGE(rid-107) for database row 107 can be skipped, again because that database row has been previously recovered.

It can be appreciated from the foregoing that the earlier-in-time operations on the database row 107 can be avoided (skipped) when the IMRS log 114 is backward scanned in accordance with the present disclosure. This can represent significant savings in time in typical crash recovery use cases, where many 100's to 1000's of updates can occur among the database rows in an in-memory row store database (IMRS DB). While conventional crash recovery processing can redo the insert of a row followed by the 100's to 1000's of subsequent updates made to that row to recovery the row, crash recovery processing in accordance with the present disclosure can recover the row in roughly a single update.

The situation can be exacerbated in a situation where 1000's of update are made to row in the IMRS DB, and then the row is packed (or moved) to page store because it has become "cold" (i.e., inactive). In conventional crash processing, the process will go through the entire life-cycle of the row, instantiate all the intermediate versions only to eventually pack (remove) the row from the IMRS DB to the page store. From the point of re-instantiating the contents of the IMRS, re-doing these operations is inefficient because it is unnecessary and wastes execution resources. By comparison, recovery processing in accordance with the present disclosure can detect that the database row is eventually packed, and will skip all earlier-in-time log records involving the packed row.

A similar inefficiency occurs for volatile transactions, where a row is inserted, updated multiple times, and then deleted. Conventional crash recovery using a forward scan of the IMRS log will again go through the row's life-cycle, creating the row, creating its multiple intermediate versions and then eventually redo the delete to remove the row from the cache. From the objective of re-instantiating the final contents of an IMRS, re-doing all the stages of the life-cycle of this row is unnecessary. All that is needed is to ensure that no footprint of the row is recovered back to the IMRS. By comparison, recovery processing in accordance with the present disclosure can detect that the newly inserted database row is eventually deleted, and will skip all earlier-in-time log records involving the deleted row.

Recovery From Database Dumps

Unlike recovering from a crashed database, recovering from a controlled dump of the IMRS log 114 need only involve performing the simple redo phase of recovery (e.g., operation 606, FIG. 6) described above. For example, the load database recovery process can be performed to load a backup copy of a previously "dumped" database. Since a dumped database is performed in a controlled manner, only fully-committed transactions are recovered. Likewise for when the IMRS log 114 is periodically dumped. For the online database operation, however, fix phase and reconcile/redo phases are all that are required to be performed before bringing the database online.

Figure 18:
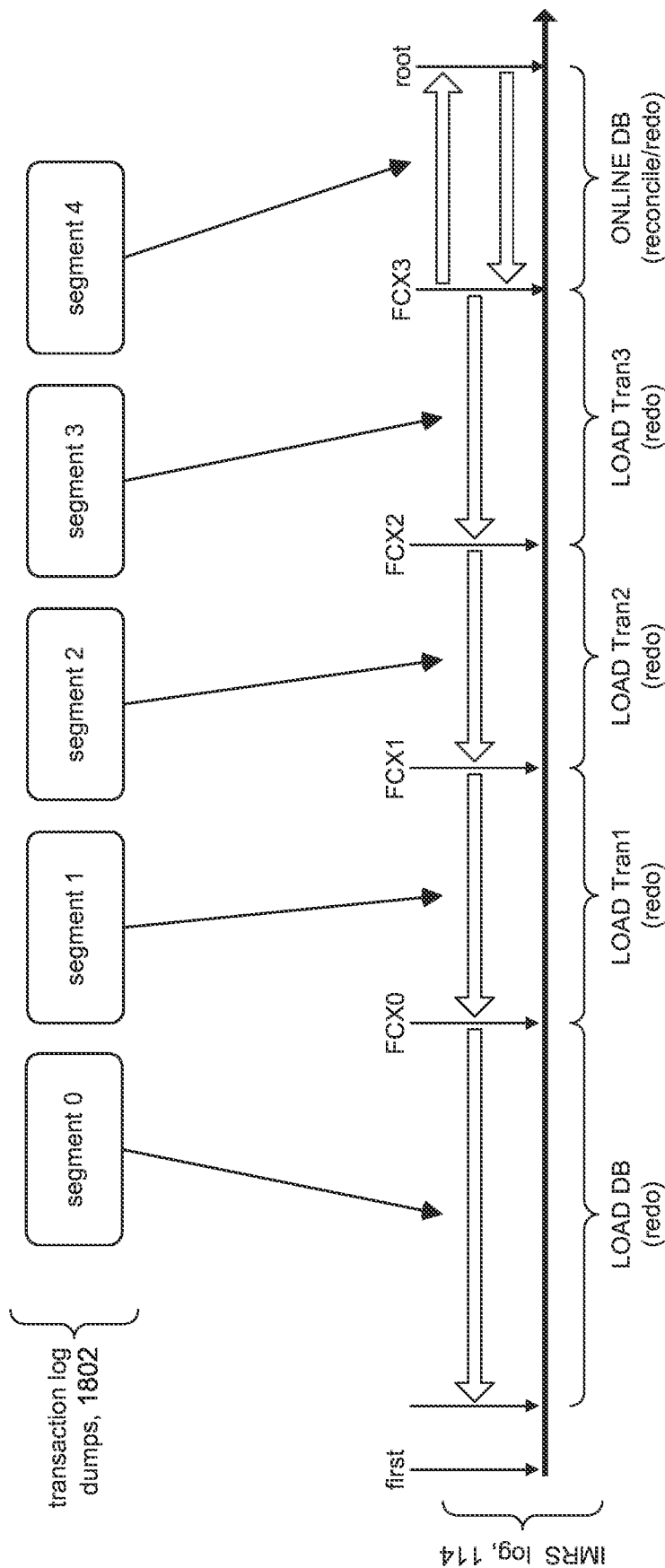
FIG. 18 illustrates examples of non-crash recovery.

The phases for the various load operations are illustrated in FIG. 18, showing the transaction dumps 1802 for a set transaction log segments 0-4 (chunks) of the IMRS log 114. FCX stands for Fully Committed Transaction marker. Transaction log segment 0 is initially processed with a LOAD DB operation, and loaded using only simple redo and backward scan of segment 0. At the end of LOAD DB operation, the region of the IMRS log 114 beyond FCX0 is still active, but is left unrecovered. Subsequent transaction log segments 1-3 can be processed by LOAD TRAN operations. In the subsequent LOAD TRAN operations, this region of the IMRS log 114 beyond FCX0 is over-laid with the transaction log segments captured in the transaction dumps 1802. The region between FCX0 and FCX1 is recovered using simple redo, backward scan of transaction log segment 1. This process continues for each subsequent LOAD TRAN until the final recovery is done for ONLINE DB on the last transaction log segment 4. Processing on the last transaction log segment 4 includes the fix phase and reconcile/redo phase.

Recovery Across Transaction Log Segments

When recovering the next chunk of the IMRS log 114, the same row may have been updated several more times, resulting in a, yet, another latest version of the row found in this chunk of the IMRS log 114. The term "transaction log chunk" refers to the piece of the IMRS log 114 that is being recovered. For example, in the scenario depicted in FIG. 18, the sections (FCX0, FCX1), (FCX1, FCX2) recovered using a backwards scan Simple-redo following a LOAD TRAN are transaction log chunks.

Changes done to a row will be recovered as part of LOAD DB or the initial LOAD TRAN (e.g., LOAD Tran 1), per the rules of crash recovery. For example, in the case of LOAD DB, if a row has multiple log records, then as part of the backward scan, the very first IMRS_INSERT log record encountered (i.e. the very last committed update to this row) is recovered, and the row will be inserted to the IMRS 122. Other IMRS_INSERT log records seen subsequently in this transaction chunk will be discarded per the crash-recovery logic of the present disclosure.

As new log records affecting the same row are seen in a subsequent LOAD TRAN's transaction log chunk, they are handled specially. If the first log record encountered for this row in the next transaction chunk is an IMRS_INSERT, it will be redone; i.e., replace the existing row in the IMRS 122 with this version. If that log record is instead an IMRS_PURGE log record, then this event is replayed to purge the row from the IMRS 122, and the RID is registered in the RID-hash table to mark that the row was eventually purged from the IMRS 122. In both cases, any older log records for the same row are essentially discarded without re-doing them.

Therefore, the following can be performed in accordance with the present disclosure:

a) Recognize the very last log record that produces the latest insert version of a row. Replace the existing latest-version of the row, if any, in the IMRS 122 (which may have been inserted to the IMRS 122 by the redo-recovery of some prior transaction log chunk) with the latest version found in the transaction log chunk being recovered, call this the current transaction log chunk.

b) All other older versions of the row found in the current transaction log chunk have to be ignored and should not be replacing the version in the IMRS 122.

c) In order to correctly perform (b), the row inserted in or purged from the IMRS 122 at (a) is marked or otherwise indicates as coming from the current transaction log chunk. Then, all other older log records affecting this same row can use this information to skip the log record.

d) If the latest log record affecting a row is a purge operation, and the row does not already exist in the IMRS 122, then record the purged row's RID in the RID-hash table. All older log records seen in the current transaction log chunk will consult the RID-hash table to see if the latest state of the row was purged. If so, then those log records are discarded.

e) Inserts followed by a Purge operation: Suppose recovery of a previous transaction log chunk inserted the latest version of a row in the IMRS. In a subsequent transaction log chunk, the row may have been eventually packed, thereby the purged row is the latest log record affecting this row. The previously inserted row is purged from the IMRS 122 and the purged row's RID is added to the RID-hash lookup table.

f) Minor subtle point: While scanning the log backwards, redo will stop at the ENDXACT of the previous-fully-committed transaction marker, which is the stopping point for the backwards scan. This transaction would already have been redone as part of the previous LOAD TRAN, so recovery of the subsequent LOAD TRAN will skip this transaction.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method for data recovery in a database, the method comprising:
   accessing a transaction log having stored therein a plurality of transaction blocks, each transaction block associated with a database transaction and corresponding operations that comprise the database transaction, the plurality of transaction blocks ordered according to when their corresponding database transactions were completed, the plurality of log records in each transaction block ordered according to when their corresponding operations were performed on the database;
   accessing a range of transaction blocks in the transaction log in reverse chronological order, starting from a latest transaction block and ending with an earliest transaction block that occurs earlier in time than the latest transaction block; and
   recovering data in the database from each of the transaction blocks accessed in reverse chronological order by recovering database rows in the database that were acted on by database transactions associated with the accessed transaction blocks, wherein:
   the range of transaction blocks comprising the latest transaction block to an earliest transaction block is a first range of transaction blocks in the transaction log, the method further comprises identifying valid transaction blocks and invalid transaction blocks in a second range of transaction blocks in the transaction log, and recovering data in the database further includes:
      accessing valid transaction blocks in the second range of transaction blocks in reverse chronological order, starting from a latest transaction block and ending with an earliest transaction block that occurs earlier in time than the latest transaction block; and
      recovering data in the database from selected ones of the valid transaction blocks accessed in reverse chronological order by recovering database rows in the database that were acted on by database transactions associated with the selected transaction blocks.

2. The method of claim 1, further comprising fixing transaction blocks in the second range of transaction blocks.

3. The method of claim 2, wherein the fixing comprises: identifying committed transaction blocks in the second range of transaction blocks; and linking together the committed transaction blocks.

4. The method of claim 2 further comprising confirming the fixed transaction blocks are committed transaction blocks to produce the valid transaction blocks in the second range of transaction blocks.

5. The method of claim 4, wherein the confirming comprises checking a buffer for the transaction log is flushed when a transaction associated with a fixed transaction block of the fixed transaction blocks operates on rows of the database.

6. The method of claim 4, wherein the confirming comprises checking a buffer for a page store is flushed when a transaction associated with a fixed transaction block of the fixed transaction blocks operates on data in the page store.

7. The method of claim 1, wherein the database is an in-memory row store (IMRS) database.

8. A non-transitory computer-readable storage medium having embodied thereon a program, the program being executable by a processor to perform a method for data recovery in a database, the method comprising:
   accessing a transaction log having stored therein a plurality of transaction blocks, each transaction block associated with a database transaction and corresponding operations that comprise the database transaction, the plurality of transaction blocks ordered according to when their corresponding database transactions were completed, the plurality of log records in each transaction block ordered according to when their corresponding operations were performed on the database;
   accessing a range of transaction blocks in the transaction log in reverse chronological order, starting from a latest transaction block and ending with an earliest transaction block that occurs earlier in time than the latest transaction block; and
   recovering data in the database from each of the transaction blocks accessed in reverse chronological order by recovering database rows in the database that were acted on by database transactions associated with the accessed transaction blocks, wherein:
   the range of transaction blocks comprising the latest transaction block to an earliest transaction block is a first range of transaction blocks in the transaction log, the method further comprises identifying valid transaction blocks and invalid transaction blocks in a second range of transaction blocks in the transaction log, and recovering data in the database further includes:
      accessing valid transaction blocks in the second range of transaction blocks in reverse chronological order, starting from a latest transaction block and ending with an earliest transaction block that occurs earlier in time than the latest transaction block; and
      recovering data in the database from selected ones of the valid transaction blocks accessed in reverse chronological order by recovering database rows in the database that were acted on by database transactions associated with the selected transaction blocks.

9. The non-transitory computer-readable storage medium of claim 8, wherein the method further comprises fixing transaction blocks in the second range of transaction blocks.

10. The non-transitory computer-readable storage medium of claim 9, wherein the fixing transaction block in the second range of transaction blocks comprises:

identifying committed transaction blocks in the second range of transaction blocks; and linking together the committed transaction blocks.

11. The non-transitory computer-readable storage medium of claim 9, wherein the method further comprises confirming the fixed transaction blocks are committed transaction blocks to produce the valid transaction blocks in the second range of transaction blocks.

12. The non-transitory computer-readable storage medium of claim 11, wherein the confirming comprises checking a buffer for the transaction log is flushed when a transaction associated with a fixed transaction block of the fixed transaction blocks operates on rows of the database.

13. The non-transitory computer-readable storage medium of claim 11, wherein the confirming comprises checking a buffer for a page store is flushed when a transaction associated with a fixed transaction block of the fixed transaction blocks operates on data in the page store.

14. The non-transitory computer-readable storage medium of claim 8, wherein the database is an in-memory row store (IMRS) database.

15. A system comprising:

a processor; and a memory communicatively coupled to the processor, the memory storing instructions executable by the processor to perform a method for data recovery in a database, the method comprising:

accessing a transaction log having stored therein a plurality of transaction blocks, each transaction block associated with a database transaction and corresponding operations that comprise the database transaction, the plurality of transaction blocks ordered according to when their corresponding database transactions were completed, the plurality of log records in each transaction block ordered according to when their corresponding operations were performed on the database;

accessing a range of transaction blocks in the transaction log in reverse chronological order, starting from a latest transaction block and ending with an earliest transaction block that occurs earlier in time than the latest transaction block; and recovering data in the database from each of the transaction blocks accessed in reverse chronological order by recovering database rows in the database that were acted on by database transactions associated with the accessed transaction blocks, wherein:

the range of transaction blocks comprising the latest transaction block to an earliest transaction block is a first range of transaction blocks in the transaction log, the method further comprises identifying valid transaction blocks and invalid transaction blocks in a second range of transaction blocks in the transaction log, and recovering data in the database further includes:

accessing valid transaction blocks in the second range of transaction blocks in reverse chronological order, starting from a latest transaction block and ending with an earliest transaction block that occurs earlier in time than the latest transaction block; and recovering data in the database from selected ones of the valid transaction blocks accessed in reverse chronological order by recovering database rows in the database that were acted on by database transactions associated with the selected transaction blocks.

16. The system of claim 15, wherein the method further comprises fixing transaction blocks in the second range of transaction blocks.

17. The system of claim 16, wherein the fixing comprises:

identifying committed transaction blocks in the second range of transaction blocks; and linking together the committed transaction blocks.

18. The system of claim 16, wherein the method further comprises confirming the fixed transaction blocks are committed transaction blocks to produce the valid transaction blocks in the second range of transaction blocks.

19. The system of claim 18, wherein the confirming comprises checking a buffer for the transaction log is flushed when a transaction associated with a fixed transaction block of the fixed transaction blocks operates on rows of the database.

20. The system of claim 18, wherein the confirming comprises checking a buffer for a page store is flushed when a transaction associated with a fixed transaction block of the fixed transaction blocks operates on data in the page store.

* * * * *